United States Patent [19]  
Okada

[11] Patent Number: 4,930,021  
[45] Date of Patent: May 29, 1990

[54] PROCESS AND APPARATUS FOR REDUCING A PICTURE WITH FINE LINE DISAPPEARANCE PREVENTION

[75] Inventor: Yoshiyuki Okada, Isehara, Japan

[73] Assignee: Fujitsu Limited, Kawasaki, Japan

[21] Appl. No.: 325,912

[22] Filed: Mar. 20, 1989

[30] Foreign Application Priority Data

Mar. 18, 1988 [JP] Japan ................... 63-063802  
Aug. 30, 1988 [JP] Japan ................... 63-213673

[51] Int. Cl.$^5$ ........................................... H04N 1/393  
[52] U.S. Cl. ..................................... 358/451; 358/454; 358/445  
[58] Field of Search ............... 358/442, 451, 456, 77, 358/448, 454; 382/47

[56] References Cited  
U.S. PATENT DOCUMENTS 4,275,450 6/1981 Potter ........................ 358/451  
4,682,243 7/1987 Hatayama .................. 358/451  
4,734,785 3/1988 Takei et al. ................. 358/77  
4,814,894 3/1989 Yoshida ..................... 358/451  
4,827,353 5/1989 Ehlers et al. ............... 358/456

Primary Examiner—Edward L. Coles, Sr.  
Attorney, Agent, or Firm—Staas & Halsey

[57] ABSTRACT

A process for reducing a picture by determining monochrome data of converted picture pixels according to logic calculations based on monochrome data of original picture pixels by using divisional regions of a picture area according to a reduction rate, for avoiding disappearance of fine lines from the converted picture. The process includes the steps of: successively receiving monochrome data of original picture pixels in the vicinity of a converted picture pixel; producing data of a line susceptible to disappearance, such data being necessary for detecting pixels along a line in the converted picture which could disappear from the converted picture due to picture conversion; discriminating regions in which the converted picture pixels are located; calculating monochrome data of a converted picture pixel based on the generated data a line susceptible to disappearance, data of discrimination of regions in which the converted picture pixels are located, and monochrome data of the original picture pixels; and producing a signal indicating the monochrome data of the converted picture pixel according to the calculation of monochrome data of the converted picture pixel.

13 Claims, 52 Drawing Sheets

Fig. 1 ANALYSIS OF PICTURE REDUCTION

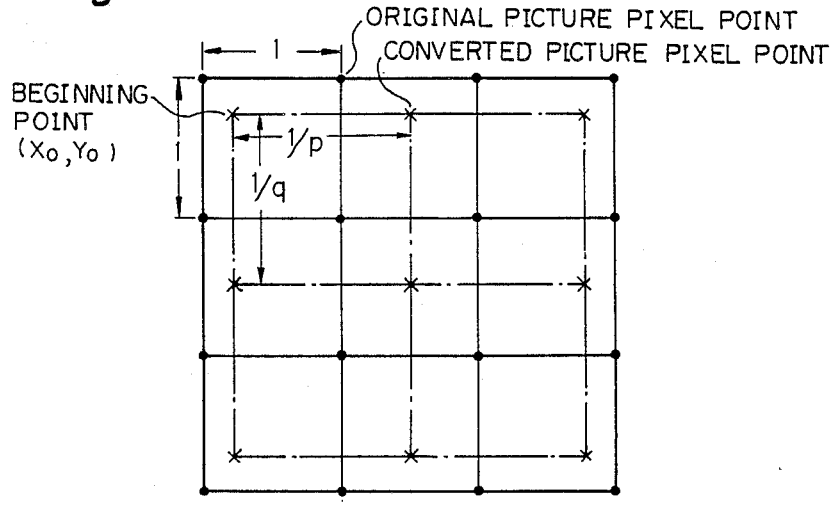

COORDINATES $(X_0, Y_0)$ OF BEGINNING POINT $$X_0 = \frac{1}{2}\left\{(Pa-1) - \left(\frac{Pa}{Pb}\right)(Pb-1)\right\}$$

$$Y_0 = \frac{1}{2}\left\{(Qa-1) - \left(\frac{Qa}{Qb}\right)(Qb-1)\right\}$$

AFTER CHANGING COORDINATE ORIGINAL $$X_0' = X_0 - \frac{1}{2}$$

$$Y_0' = Y_0 - \frac{1}{2}$$

SYMBOLS

- $Pa$ — No. OF PIXELS PER LINE IN ORIGINAL PICTURE IN X-AXIS DIRECTION
- $Pb$ — No. OF PIXELS PER LINE IN REDUCED PICTURE IN X-AXIS DIRECTION
- $Qa$ — No. OF PIXELS PER LINE IN ORIGINAL PICTURE IN Y-AXIS DIRECTION
- $Qb$ — No. OF PIXELS PER LINE IN REDUCED PICTURE IN Y-AXIS DIRECTION
- $p$ — REDUCTION RATE IN X-AXIS DIRECTION $\left(p = \frac{Pb}{Pa}\right)$
- $q$ — REDUCTION RATE IN Y-AXIS DIRECTION $\left(q = \frac{Qb}{Qa}\right)$ Fig. 2  DIVISIONS INTO SECTIONS
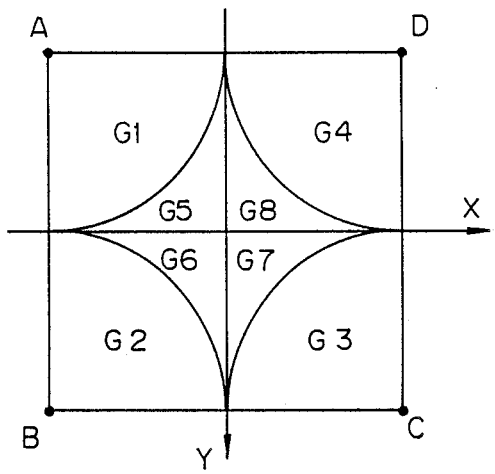
Fig. 3  CURVE DEFINITION
EQUATION:
$$(px + 0.5)(qy + 0.5) = 0.5$$
$\begin{Bmatrix} p: \text{REDUCTION FACTOR IN X-DIRECTION} \\ q: \text{REDUCTION FACTOR IN Y-DIRECTION} \\ x: \text{COORDINATE IN X-DIRECTION} \\ y: \text{COORDINATE IN Y-DIRECTION} \\ x \longrightarrow -x \quad \text{FOR} \quad x \leq 0 \\ y \longrightarrow -y \quad \text{FOR} \quad y \leq 0 \end{Bmatrix}$

Fig. 4  LOGIC CALCULATION
| SECTION | LOGIC CALCULATION |
|---|---|
| G 1 | A |
| G 2 | B |
| G 3 | C |
| G 4 | D |
| G 5 | A * (B+C+D) + B * C * D |
| G 6 | B * (A+C+D) + A * C * D |
| G 7 | C * (A+B+D) + A * B * D |
| G 8 | D * (A+B+C) + A * B * C |
Fig. 9  DIVISION OF AREA
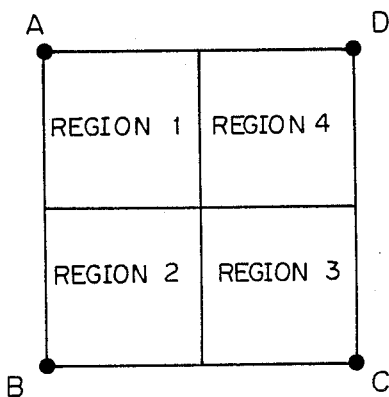

FINE LINE DISAPPEARANCE

EXAMPLE OF DISTRIBUTION OF ORIGINAL PICTURE PIXELS

Fig. 8
LOCATION (1/0) OF REDUCED PICTURE PIXEL ALONG X-AXIS DIRECTION
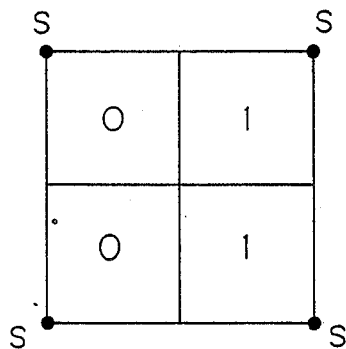
LOCATION (1/0) OF REDUCED PICTURE PIXEL ALONG Y-AXIS DIRECTION
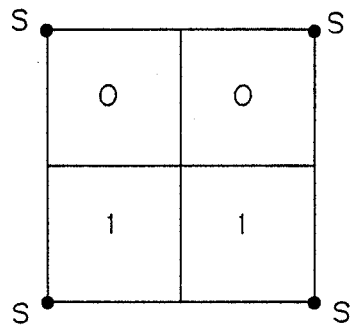

Fig. 11A PATTERNS OF FINE LINE DISAPPEARANCE
$(1 > p \geq 1/2, \ 1 > q \geq 1/2)$
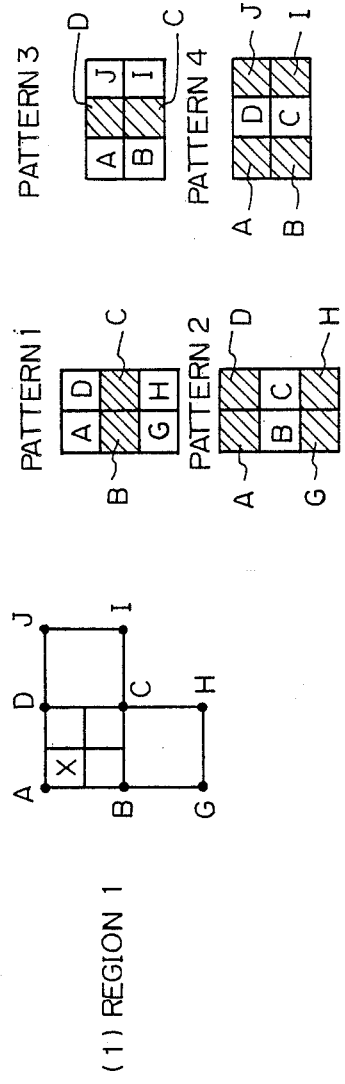
(1) REGION 1
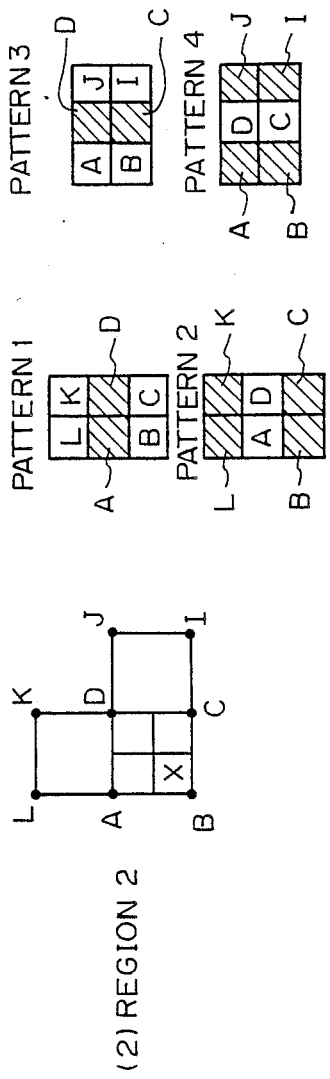
(2) REGION 2

Fig. 12A

CONDITION FOR DETECTING PIXELS SUSCEPTIBLE TO DISAPPEARANCE $(1 > p \geq 1/2, \ 1 > q \geq 1/2)$

| REGION No. | CONDITION No. | x shift 1 | y shift 1 | LOCATION OF X1 ($X_1 > 0$) | LOCATION OF X2 ($X_2 > 0$) | LOCATION OF Y1 ($Y_1 > 0$) | LOCATION OF Y2 ($Y_2 > 0$) | DETECTION RESULT |
|---|---|---|---|---|---|---|---|---|
| | 1 | 1 | 1 | 0 | 0 | 0 | 0 | NO LINE SUSCEPTIBLE TO DISAPPEARANCE |
| | 2 | 1 | 1 | 0 | 0 | 0 | 1 | PATTERN 1,2 |
| | 3 | 1 | 1 | 0 | 1 | 0 | 0 | PATTERN 3,4 |
| | 4 | 1 | 1 | 0 | 1 | 0 | 1 | PATTERN 1,2,3,4 |
| | 5 | 1 | 2 | 0 | 0 | 0 | 0 | PATTERN 1,2 |
| | 6 | 1 | 2 | 0 | 0 | 0 | 1 | IMPOSSIBLE |
| | 7 | 1 | 2 | 0 | 1 | 0 | 0 | PATTERN 1,2,3,4 |
| REGION 1 | 8 | 1 | 2 | 0 | 1 | 0 | 1 | IMPOSSIBLE |
| | 9 | 2 | 1 | 0 | 0 | 0 | 0 | PATTERN 3,4 |
| | 10 | 2 | 1 | 0 | 0 | 0 | 1 | PATTERN 1,2,3,4 |
| | 11 | 2 | 1 | 0 | 1 | 0 | 0 | IMPOSSIBLE |
| | 12 | 2 | 1 | 0 | 1 | 0 | 1 | IMPOSSIBLE |
| | 13 | 2 | 2 | 0 | 0 | 0 | 0 | PATTERN 1,2,3,4 |
| | 14 | 2 | 2 | 0 | 0 | 0 | 1 | IMPOSSIBLE |
| | 15 | 2 | 2 | 0 | 1 | 0 | 0 | IMPOSSIBLE |
| | 16 | 2 | 2 | 0 | 1 | 0 | 1 | IMPOSSIBLE |

Fig.12B

| REGION No. | CONDITION No. | x shift 1 | y shift 0 | LOCATION OF X1 (X1>0) | LOCATION OF X2 (X2>0) | LOCATION OF Y0 (Y0>0) | LOCATION OF Y1 (Y1>0) | DETECTION RESULT |
|---|---|---|---|---|---|---|---|---|
| | 1 | 1 | 1 | 0 | 0 | 0 | 1 | PATTERN 1,2 (REDUNDANT) |
| | 2 | 1 | 1 | 0 | 0 | 1 | 1 | NO LINE SUSCEPTIBLE TO DISAPPEARANCE |
| | 3 | 1 | 1 | 0 | 1 | 0 | 1 | PATTERN 1,2,3,4 (1,2 REDUNDANT) |
| | 4 | 1 | 1 | 0 | 1 | 1 | 1 | PATTERN 3,4 |
| | 5 | 1 | 2 | 0 | 0 | 0 | 1 | IMPOSSIBLE |
| | 6 | 1 | 2 | 0 | 0 | 1 | 1 | PATTERN 1,2 |
| | 7 | 1 | 2 | 0 | 1 | 0 | 1 | IMPOSSIBLE |
| | 8 | 1 | 2 | 0 | 1 | 1 | 1 | PATTERN 1,2,3,4 |
| REGION2 | 9 | 2 | 1 | 0 | 0 | 0 | 1 | PATTERN 1,2,3,4 (1,2 REDUNDANT) |
| | 10 | 2 | 1 | 0 | 0 | 1 | 1 | PATTERN 3,4 |
| | 11 | 2 | 1 | 0 | 1 | 0 | 1 | IMPOSSIBLE |
| | 12 | 2 | 1 | 0 | 1 | 1 | 1 | IMPOSSIBLE |
| | 13 | 2 | 2 | 0 | 0 | 0 | 1 | IMPOSSIBLE |
| | 14 | 2 | 2 | 0 | 0 | 1 | 1 | PATTERN 1,2,3,4 |
| | 15 | 2 | 2 | 0 | 1 | 0 | 1 | IMPOSSIBLE |
| | 16 | 2 | 2 | 0 | 1 | 1 | 1 | IMPOSSIBLE |

Fig. 12C

| REGION No. | CONDITION No. | x shift 0 | y shift 0 | LOCATION OF X₀ (X₀>0) | LOCATION OF X₁ (X₁>0) | LOCATION OF Y₀ (Y₀>0) | LOCATION OF Y₁ (Y₁>0) | DETECTION RESULT |
|---|---|---|---|---|---|---|---|---|
| | 1 | 1 | 1 | 0 | 1 | 0 | 1 | PATTERN 1,2,3,4 (REDUNDANT) |
| | 2 | 1 | 1 | 0 | 1 | 1 | 1 | PATTERN 3,4 (REDUNDANT) |
| | 3 | 1 | 1 | 1 | 1 | 0 | 1 | PATTERN 1,2 (REDUNDANT) |
| | 4 | 1 | 1 | 1 | 1 | 1 | 1 | NO LINE SUSCEPTIBLE TO DISAPPEARANCE |
| | 5 | 1 | 2 | 0 | 1 | 0 | 1 | IMPOSSIBLE |
| | 6 | 1 | 2 | 0 | 1 | 1 | 1 | PATTERN 1,2,3,4,3,4 REDUNDANT) |
| REGION 3 | 7 | 1 | 2 | 1 | 1 | 0 | 1 | IMPOSSIBLE |
| | 8 | 1 | 2 | 1 | 1 | 1 | 1 | PATTERN 1,2 |
| | 9 | 2 | 1 | 0 | 1 | 0 | 1 | IMPOSSIBLE |
| | 10 | 2 | 1 | 0 | 1 | 1 | 1 | IMPOSSIBLE |
| | 11 | 2 | 1 | 1 | 1 | 0 | 1 | PATTERN 1,2,3,4 (1,2 REDUNDANT) |
| | 12 | 2 | 1 | 1 | 1 | 1 | 1 | PATTERN 3,4 |
| | 13 | 2 | 2 | 0 | 1 | 0 | 1 | IMPOSSIBLE |
| | 14 | 2 | 2 | 0 | 1 | 1 | 1 | IMPOSSIBLE |
| | 15 | 2 | 2 | 1 | 1 | 0 | 1 | IMPOSSIBLE |
| | 16 | 2 | 2 | 1 | 1 | 1 | 1 | PATTERN 1,2,3,4 |

Fig. 12D

| REGION No. | CONDITION No. | x shift 0 | y shift 1 | LOCATION OF X0 ($X_0 > 0$) | LOCATION OF X1 ($X_1 > 0$) | LOCATION OF Y1 ($Y_1 > 0$) | LOCATION OF Y2 ($Y_2 > 0$) | DETECTION RESULT |
|---|---|---|---|---|---|---|---|---|
| | 1 | 1 | 1 | 0 | 0 | 0 | 0 | PATTERN 3,4 (REDUNDANT) |
| | 2 | 1 | 1 | 0 | 1 | 0 | 1 | PATTERN 1,2,3,4 (3,4 REDUNDANT) |
| | 3 | 1 | 1 | 1 | 1 | 0 | 0 | NO LINE SUSCEPTIBLE TO DISAPPEARANCE |
| | 4 | 1 | 1 | 1 | 1 | 0 | 1 | PATTERN 1, 2 |
| | 5 | 1 | 2 | 0 | 0 | 0 | 0 | PATTERN 1,2,3,4 (3,4 REDUNDANT) |
| | 6 | 1 | 2 | 0 | 1 | 0 | 1 | IMPOSSIBLE |
| REGION 4 | 7 | 1 | 2 | 1 | 1 | 0 | 0 | PATTERN 1, 2 |
| | 8 | 1 | 2 | 1 | 1 | 0 | 1 | IMPOSSIBLE |
| | 9 | 2 | 1 | 0 | 1 | 0 | 0 | IMPOSSIBLE |
| | 10 | 2 | 1 | 0 | 1 | 0 | 1 | IMPOSSIBLE |
| | 11 | 2 | 1 | 1 | 1 | 0 | 0 | PATTERN 3, 4 |
| | 12 | 2 | 1 | 1 | 1 | 0 | 1 | PATTERN 1,2,3,4 |
| | 13 | 2 | 2 | 0 | 1 | 0 | 0 | IMPOSSIBLE |
| | 14 | 2 | 2 | 0 | 1 | 0 | 1 | IMPOSSIBLE |
| | 15 | 2 | 2 | 1 | 1 | 0 | 0 | PATTERN 1,2,3,4 |
| | 16 | 2 | 2 | 1 | 1 | 0 | 1 | IMPOSSIBLE |

SECTIONS

Fig. 13A

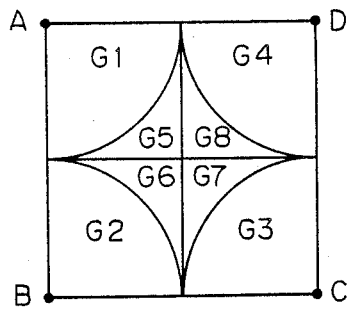

Fig. 13B

LOGIC CALCULATION
$(1 > p \geq 1/2, 1 > q \geq 1/2)$

| SECTION | LOGIC CALCULATION |
|---|---|
| G1 | A * $\overline{P2}$ * $\overline{P4}$ + P1 + P3 |
| G2 | B * $\overline{P2}$ * $\overline{P4}$ + P1 + P3 |
| G3 | C * $\overline{P2}$ * $\overline{P4}$ + P1 + P3 |
| G4 | D * $\overline{P2}$ * $\overline{P4}$ + P1 + P3 |
| G5 | A * (B * $\overline{P4}$ + D * $\overline{P2}$ + C) + P1 + P3 |
| G6 | B * (A * $\overline{P4}$ + C * $\overline{P2}$ + D) + P1 + P3 |
| G7 | C * (D * $\overline{P4}$ + B * $\overline{P2}$ + A) + P1 + P3 |
| G8 | D * (C * $\overline{P4}$ + A * $\overline{P2}$ + B) + P1 + P3 |

$\left\{\begin{array}{l} P1 = U * (\text{PATTERN No.1}) \\ P2 = U * (\text{PATTERN No.2}) \\ P3 = V * (\text{PATTERN No.3}) \\ P4 = V * (\text{PATTERN No.4}) \\ U = 1 \text{ FOR PATTERN No.1, No.2} \\ V = 1 \text{ FOR PATTERN No.3, No.4} \\ \overline{P2} = 0 \text{ FOR PATTERN No.2} \\ \overline{P4} = 0 \text{ FOR PATTERN No.4} \end{array}\right\}$

Fig. 13C

LOGIC CALCULATION
($1/2 > p \geq 1/3$, $1/2 > q \geq 1/3$)

| SECTION | LOGIC CALCULATION |
|---|---|
| G 1 | $A * \overline{P1} * \overline{P3} * \overline{P5} + Q1 + Q3 + Q5$ |
| G 2 | $B * \overline{P1} * \overline{P3} * \overline{P5} + Q1 + Q3 + Q5$ |
| G 3 | $C * \overline{P2} * \overline{P4} * \overline{P6}$ |
| G 4 | $D * \overline{P2} * \overline{P4} * \overline{P6}$ |
| G 5 | $A*(B*\overline{P1}*\overline{P3}*\overline{P5}+C+D)+B*C*D+Q1+Q3+Q5$ |
| G 6 | $B*(A*\overline{P1}*\overline{P3}*\overline{P5}+C+D)+A*C*D+Q1+Q3+Q5$ |
| G 7 | $C*(D*\overline{P2}*\overline{P4}*\overline{P6}+A+B)+A*B*D+Q2+Q4+Q6$ |
| G 8 | $D*(C*\overline{P2}*\overline{P4}*\overline{P6}+A+B)+A*B*C+Q2+Q4+Q6$ |

$P1 = A*B*\overline{C}*\overline{D}*E*F*G*H*I*J*K*L$ ---------- PATTERN 7
$P2 = V1*A*B*C*D*E*F*\overline{G}*\overline{H}*I*J*K*L$ ------- PATTERN 8
$P3 = V2*A*B*E*F*I*J*K*L*(\overline{C},\overline{D},\overline{G},\overline{H})$ ---- PATTERNS 30~36
$P4 = \overline{A}*\overline{B}*C*D*E*F*G*H*I*J*K*L$ ------- PATTERN 5
$P5 = V3*A*B*C*D*E*\overline{F}*\overline{G}*H*I*J*K*L$ ---- PATTERN 6
$P6 = V4*C*D*G*H*I*J*K*L*(\overline{A},\overline{B},\overline{E},\overline{F})$ ---- PATTERNS 23~29
$Q1 = \overline{A}*\overline{B}*C*D*\overline{E}*\overline{F}*\overline{G}*\overline{H}*\overline{I}*\overline{J}*\overline{K}*\overline{L}$ ------- PATTERN 3
$Q2 = V1*\overline{A}*\overline{B}*C*D*\overline{E}*\overline{F}*\overline{G}*\overline{H}*\overline{I}*\overline{J}*\overline{K}*\overline{L}$ ---- PATTERN 4
$Q3 = V2*\overline{A}*\overline{B}*\overline{E}*\overline{F}*\overline{I}*\overline{J}*\overline{K}*\overline{L}*(C,D,G,H)$ ---- PATTERNS 16~22
$Q4 = A*B*\overline{C}*\overline{D}*\overline{E}*\overline{F}*\overline{G}*\overline{H}*\overline{I}*\overline{J}*\overline{K}*\overline{L}$ ----- PATTERN 1
$Q5 = V3*\overline{A}*\overline{B}*\overline{C}*\overline{D}*E*F*\overline{G}*\overline{H}*\overline{I}*\overline{J}*\overline{K}*\overline{L}$ --- PATTERN 2
$Q6 = V4*C*D*G*H*I*J*K*L*(A,B,E,F)$ --- PATTERNS 9~15

$V1 = 1$ FOR $X_{shift1} = 3$
$V2 = 1$ FOR $X_{shift1} = 2$ AND $X_2 > 0$
        OR
        $X_{shift1} = 3$ AND $X_2 < 0$
$V3 = 1$ FOR $X_{shift0} = 3$ AND $X_0 < 0$
$V4 = 1$ FOR $X_{shift0} = 3$ $(\overline{C},\overline{D},\overline{G},\overline{H}) = \overline{C}*\overline{H} + \overline{D}*\overline{G} + \overline{C}*\overline{D}*\overline{G} + \overline{C}*\overline{D}*\overline{H} + \overline{C}*\overline{G}*\overline{H} + \overline{D}*\overline{G}*\overline{H} + \overline{C}*\overline{D}*\overline{G}*\overline{H}$

Fig. 15
FINE LINE PATTERNS
(LINE WIDTH ---- ONE UNIT)
$1/2 > P \geqq 1/3$
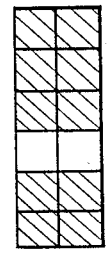
PATTERN 1.
PATTERN 2.
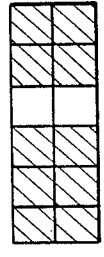
PATTERN 3.
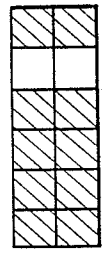
PATTERN 4.
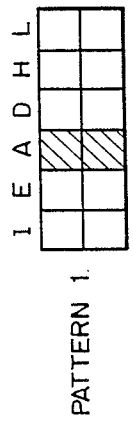
PATTERN 5.
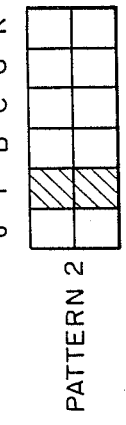
PATTERN 6.
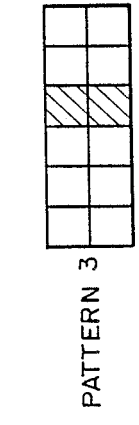
PATTERN 7.
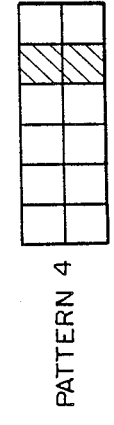
PATTERN 8.

DISTRIBUTION OF ORIGINAL PICTURE PIXELS

Fig. 19    DIVISION OF AREA
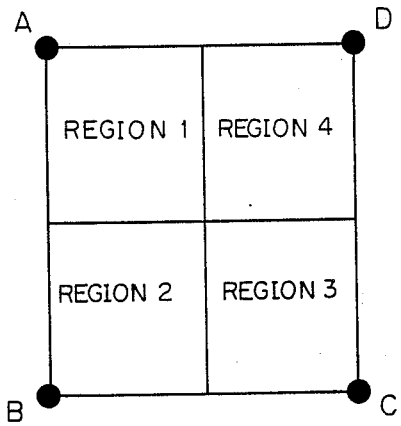
Fig. 20    REFERENCE PIXELS
($1 > p \geq 1/2$, $1 > q \geq 1/2$)
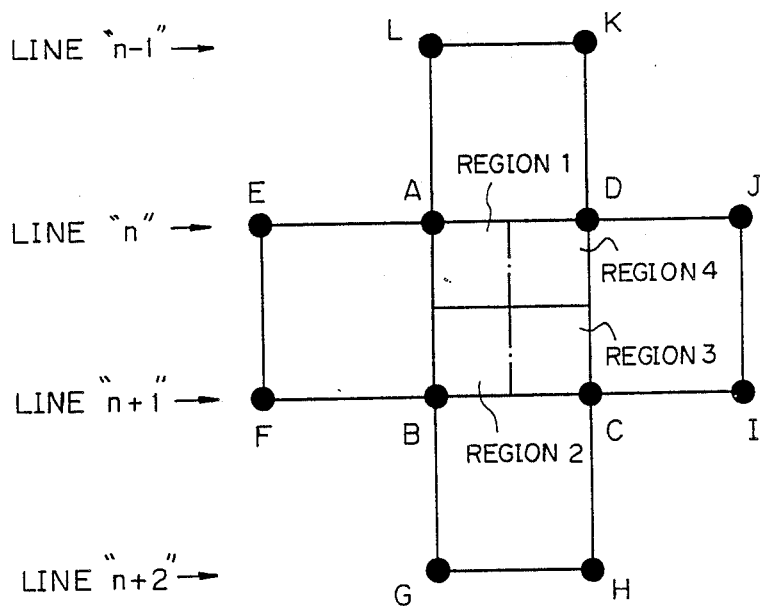

Fig. 21A

CONDITION FOR DETECTION PIXELS SUSCEPTIBLE TO DISAPPEARANCE $(1 > p \geq 1/2, \ 1 > q \geq 1/2)$

| REGION No. | CONDITION No. | x shift 1 | y shift 1 | LOCATION OF $X_1$ ($X_1 > 0$) | LOCATION OF $X_2$ ($X_2 > 0$) | LOCATION OF $Y_1$ ($Y_1 > 0$) | LOCATION OF $Y_2$ ($Y_2 > 0$) | DETECTION RESULT |
|---|---|---|---|---|---|---|---|---|
| | 1 | 1 | 1 | 0 | 0 | 0 | 0 | NO LINE SUSCEPTIBLE TO DISAPPEARANCE |
| | 2 | 1 | 1 | 0 | 0 | 0 | 1 | PATTERN No. 1, 2 |
| | 3 | 1 | 1 | 0 | 1 | 0 | 0 | PATTERN No. 3, 4 |
| | 4 | 1 | 1 | 0 | 1 | 0 | 1 | PATTERN No. 1, 2, 3, 4 |
| | 5 | 1 | 2 | 0 | 0 | 0 | 0 | PATTERN No. 1, 2 |
| | 6 | 1 | 2 | 0 | 0 | 0 | 1 | IMPOSSIBLE |
| REGION 1 | 7 | 1 | 2 | 0 | 1 | 0 | 0 | PATTERN No. 1, 2, 3, 4 |
| | 8 | 1 | 2 | 0 | 1 | 0 | 1 | IMPOSSIBLE |
| | 9 | 2 | 1 | 0 | 0 | 0 | 0 | PATTERN No. 3, 4 |
| | 10 | 2 | 1 | 0 | 0 | 0 | 1 | PATTERN No. 1, 2, 3, 4 |
| | 11 | 2 | 1 | 0 | 1 | 0 | 0 | IMPOSSIBLE |
| | 12 | 2 | 1 | 0 | 1 | 0 | 1 | IMPOSSIBLE |
| | 13 | 2 | 2 | 0 | 0 | 0 | 0 | PATTERN No. 1, 2, 3, 4 |
| | 14 | 2 | 2 | 0 | 0 | 0 | 1 | IMPOSSIBLE |
| | 15 | 2 | 2 | 0 | 1 | 0 | 0 | IMPOSSIBLE |
| | 16 | 2 | 2 | 0 | 1 | 0 | 1 | IMPOSSIBLE |

Fig. 21B

| REGION No. | CONDITION No. | x shift 1 | y shift 0 | LOCATION OF $X_1$ ($X_1 > 0$) | LOCATION OF $X_2$ ($X_2 > 0$) | LOCATION OF $Y_0$ ($Y_0 > 0$) | LOCATION OF $Y_1$ ($Y_1 > 0$) | DETECTION RESULT |
|---|---|---|---|---|---|---|---|---|
| | 1 | 1 | 1 | 0 | 0 | 0 | 1 | PATTERN No.1,2 (REDUNDANT) |
| | 2 | 1 | 1 | 0 | 0 | 1 | 1 | NO LINE SUSCEPTIBLE TO DISAPPEARANCE |
| | 3 | 1 | 1 | 0 | 1 | 0 | 1 | PATTERN No.1,2,3,4 (REDUNDANT) |
| | 4 | 1 | 1 | 0 | 1 | 1 | 1 | PATTERN No.3,4 |
| | 5 | 1 | 2 | 0 | 0 | 0 | 1 | IMPOSSIBLE |
| | 6 | 1 | 2 | 0 | 0 | 1 | 1 | PATTERN No.1,2 |
| | 7 | 1 | 2 | 0 | 1 | 0 | 1 | IMPOSSIBLE |
| REGION 2 | 8 | 1 | 2 | 0 | 1 | 1 | 1 | PATTERN No.1,2,3,4 |
| | 9 | 2 | 1 | 0 | 0 | 0 | 1 | PATTERN No.1,2,3,4 (REDUNDANT) |
| | 10 | 2 | 1 | 0 | 0 | 1 | 1 | PATTERN No.3,4 |
| | 11 | 2 | 1 | 0 | 1 | 0 | 1 | IMPOSSIBLE |
| | 12 | 2 | 1 | 0 | 1 | 1 | 1 | IMPOSSIBLE |
| | 13 | 2 | 2 | 0 | 0 | 0 | 1 | IMPOSSIBLE |
| | 14 | 2 | 2 | 0 | 0 | 1 | 1 | PATTERN No.1,2,3,4 |
| | 15 | 2 | 2 | 0 | 1 | 0 | 1 | IMPOSSIBLE |
| | 16 | 2 | 2 | 0 | 1 | 1 | 1 | IMPOSSIBLE |

Fig. 21C

| REGION No. | CONDITION No. | x shift | y shift | LOCATION OF $X_0$ ($X_0 > 0$) | LOCATION OF $X_1$ ($X_1 > 0$) | LOCATION OF $Y_0$ ($Y_0 > 0$) | LOCATION OF $Y_1$ ($Y_1 > 0$) | DETECTION RESULT |
|---|---|---|---|---|---|---|---|---|
| REGION 3 | 1 | 1 | 1 | 0 | 0 | 0 | 1 | PATTERN No.1,2,3,4 (REDUNDANT) |
| | 2 | 1 | 1 | 0 | 1 | 1 | 1 | PATTERN No.3,4 (REDUNDANT) |
| | 3 | 1 | 1 | 1 | 1 | 0 | 1 | PATTERN No.1,2 (REDUNDANT) |
| | 4 | 1 | 1 | 1 | 1 | 1 | 1 | NO LINE SUSCEPTIBLE TO DISAPPEARANCE |
| | 5 | 1 | 2 | 0 | 0 | 0 | 1 | IMPOSSIBLE |
| | 6 | 1 | 2 | 0 | 1 | 1 | 1 | PATTERN No.1,2,3,4 (REDUNDANT) |
| | 7 | 1 | 2 | 1 | 1 | 0 | 1 | IMPOSSIBLE |
| | 8 | 1 | 2 | 1 | 1 | 1 | 1 | PATTERN No.1,2 |
| | 9 | 2 | 1 | 0 | 1 | 0 | 1 | IMPOSSIBLE |
| | 10 | 2 | 1 | 0 | 1 | 1 | 1 | IMPOSSIBLE |
| | 11 | 2 | 1 | 1 | 1 | 0 | 1 | PATTERN No.1,2,3,4 (REDUNDANT) |
| | 12 | 2 | 2 | 1 | 1 | 1 | 1 | PATTERN No.3,4 |
| | 13 | 2 | 2 | 0 | 1 | 0 | 1 | IMPOSSIBLE |
| | 14 | 2 | 2 | 0 | 1 | 1 | 1 | IMPOSSIBLE |
| | 15 | 2 | 2 | 1 | 1 | 0 | 1 | IMPOSSIBLE |
| | 16 | 2 | 2 | 1 | 1 | 1 | 1 | PATTERN No.1,2,3,4 |

Fig. 21D

| REGION No. | CONDITION No. | x shift O | y shift 1 | LOCATION OF $X_0$ ($X_0>0$) | LOCATION OF $X_1$ ($X_1>0$) | LOCATION OF $Y_1$ ($Y_1>0$) | LOCATION OF $Y_2$ ($Y_2>0$) | DETECTION RESULT |
|---|---|---|---|---|---|---|---|---|
| | 1 | 1 | 1 | 0 | 1 | 0 | 0 | PATTERN No.3,4 (REDUNDANT) |
| | 2 | 1 | 1 | 0 | 1 | 0 | 1 | PATTERN No.1,2,3,4 (REDUNDANT) |
| | 3 | 1 | 1 | 1 | 1 | 0 | 0 | NO LINE SUSCEPTIBLE TO DISAPPEARANCE |
| | 4 | 1 | 1 | 0 | 1 | 0 | 1 | PATTERN No. 1,2 |
| | 5 | 1 | 2 | 0 | 1 | 0 | 0 | PATTERN No.1,2,3,4 (REDUNDANT) |
| | 6 | 1 | 2 | 0 | 1 | 0 | 0 | IMPOSSIBLE |
| | 7 | 1 | 2 | 1 | 1 | 0 | 0 | PATTERN No. 1,2 |
| REGION 4 | 8 | 1 | 2 | 1 | 1 | 0 | 1 | IMPOSSIBLE |
| | 9 | 2 | 1 | 0 | 1 | 0 | 0 | IMPOSSIBLE |
| | 10 | 2 | 1 | 0 | 1 | 0 | 1 | IMPOSSIBLE |
| | 11 | 2 | 1 | 1 | 1 | 0 | 0 | PATTERN No. 3,4 |
| | 12 | 2 | 2 | 1 | 1 | 0 | 1 | PATTERN No. 1,2,3,4 |
| | 13 | 2 | 2 | 0 | 1 | 0 | 0 | IMPOSSIBLE |
| | 14 | 2 | 2 | 0 | 1 | 0 | 1 | IMPOSSIBLE |
| | 15 | 2 | 2 | 1 | 1 | 0 | 0 | PATTERN No.1,2,3,4 |
| | 16 | 2 | 2 | 1 | 1 | 0 | 1 | IMPOSSIBLE |

Fig. 22

LOGIC CALCULATION $$(1 > p \geq 1/2, \ 1 > q \geq 1/2)$$

| SECTION | LOGIC CALCULATION |
|---|---|
| G 1 | A * $\overline{P2}$ * $\overline{P4}$ + P1 + P3 |
| G 2 | B * $\overline{P2}$ * $\overline{P4}$ + P1 + P3 |
| G 3 | C * $\overline{P2}$ * $\overline{P4}$ + P1 + P3 |
| G 4 | D * $\overline{P2}$ * $\overline{P4}$ + P1 + P3 |
| G 5 | A * (B * $\overline{P4}$ + D * $\overline{P2}$ + C) + B * C * D + P1 + P3 |
| G 6 | B * (A * $\overline{P4}$ + C * $\overline{P2}$ + D) + A * C * D + P1 + P3 |
| G 7 | C * (D * $\overline{P4}$ + B * $\overline{P2}$ + A) + A * B * D + P1 + P3 |
| G 8 | D * (C * $\overline{P4}$ + A * $\overline{P2}$ + B) + A * B * C + P1 + P3 |

$$\begin{bmatrix} P1 = U1 * (\text{PATTERN 1}) & --- & \text{PATTERN 1 (Fig.11)} \\ P2 = U1 * (\text{PATTERN 2}) & --- & \text{PATTERN 2 ( } '' \text{ )} \\ P3 = V1 * (\text{PATTERN 3}) & --- & \text{PATTERN 3 ( } '' \text{ )} \\ P4 = V1 * (\text{PATTERN 4}) & --- & \text{PATTERN 4 ( } '' \text{ )} \end{bmatrix}$$

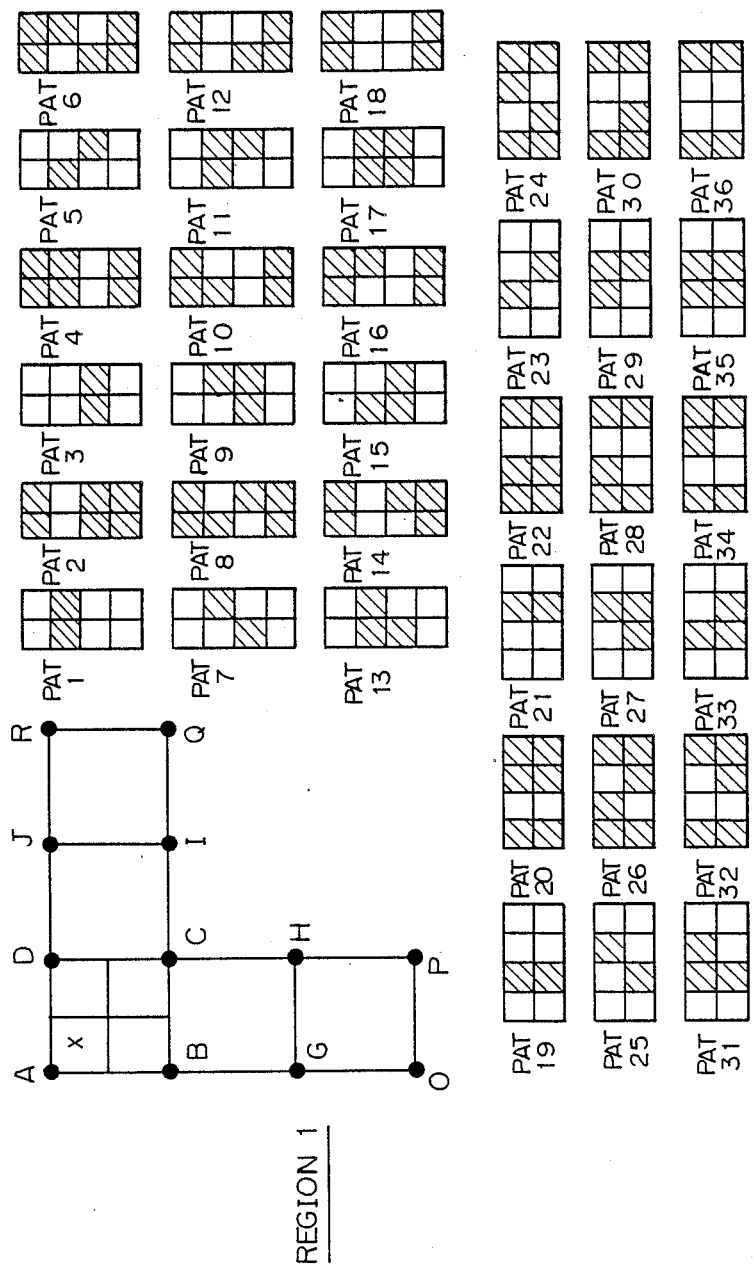

REGION 4

Fig. 25A

CONDITION FOR DETECTING PIXELS SUSCEPTIBLE TO DISAPPEARANCE $(1/2 > p \geq 1/3,\ 1/2 > q \geq 1/3)$

| REGION No. | CONDITION No. | x shift 1 | y shift 1 | LOCATION OF $X_1$ ($X_1 > 0$) | LOCATION OF $X_2$ ($X_2 > 0$) | LOCATION OF $Y_1$ ($Y_1 > 0$) | LOCATION OF $Y_2$ ($Y_2 > 0$) | DETECTION RESULT |
|---|---|---|---|---|---|---|---|---|
| REGION 1 | 1 | 2 | 2 | 0 | 0 | 0 | 0 | PATTERN No.1,2,19,20 |
| | 2 | 2 | 2 | 0 | 0 | 0 | 1 | PATTERN No.1~18,19,20 |
| | 3 | 2 | 2 | 0 | 1 | 0 | 0 | PATTERN No.1,2,19~36 |
| | 4 | 2 | 2 | 0 | 1 | 0 | 1 | PATTERN No.1~36 |
| | 5 | 2 | 3 | 0 | 0 | 0 | 0 | PATTERN No.1~18,19,20 |
| | 6 | 2 | 3 | 0 | 0 | 0 | 1 | IMPOSSIBLE |
| | 7 | 2 | 3 | 0 | 1 | 0 | 0 | PATTERN No.1~36 |
| | 8 | 2 | 3 | 0 | 1 | 0 | 1 | IMPOSSIBLE |
| | 9 | 2 | 2 | 0 | 0 | 0 | 0 | PATTERN No.1,2,19~36 |
| | 10 | 2 | 2 | 0 | 0 | 0 | 1 | PATTERN No.1~36 |
| | 11 | 2 | 2 | 0 | 1 | 0 | 0 | IMPOSSIBLE |
| | 12 | 2 | 2 | 0 | 1 | 0 | 1 | IMPOSSIBLE |
| | 13 | 2 | 3 | 0 | 0 | 0 | 0 | PATTERN No.1~36 |
| | 14 | 2 | 3 | 0 | 0 | 0 | 1 | IMPOSSIBLE |
| | 15 | 2 | 3 | 0 | 1 | 0 | 0 | IMPOSSIBLE |
| | 16 | 2 | 3 | 0 | 1 | 0 | 1 | IMPOSSIBLE |

Fig. 25B

| REGION No. | CONDITION No. | x shift 1 | y shift 0 | LOCATION OF $X_1$ ($X_1>0$) | LOCATION OF $X_2$ ($X_2>0$) | LOCATION OF $Y_0$ ($Y_0>0$) | LOCATION OF $Y_1$ ($Y_1>0$) | DETECTION RESULT |
|---|---|---|---|---|---|---|---|---|
| | 1 | 2 | 2 | 0 | 0 | 0 | 1 | PATTERN No.1-18,19,20(REDUNDANT) |
| | 2 | 2 | 2 | 0 | 0 | 1 | 1 | PATTERN No.3,4,19,20 |
| | 3 | 2 | 2 | 0 | 1 | 0 | 1 | PATTERN No.1-36(REDUNDANT) |
| | 4 | 2 | 2 | 0 | 1 | 1 | 1 | PATTERN No.3,4,19-36 |
| | 5 | 2 | 3 | 0 | 0 | 0 | 1 | IMPOSSIBLE |
| | 6 | 2 | 3 | 0 | 0 | 1 | 1 | PATTERN No.1-18,19,20 |
| | 7 | 2 | 3 | 0 | 1 | 0 | 1 | IMPOSSIBLE |
| REGION 2 | 8 | 2 | 3 | 0 | 1 | 1 | 1 | PATTERN No.1-36 |
| | 9 | 3 | 2 | 0 | 0 | 0 | 1 | PATTERN No.1-36(REDUNDANT) |
| | 10 | 3 | 2 | 0 | 0 | 1 | 1 | PATTERN No.3,4,19-36 |
| | 11 | 3 | 2 | 0 | 1 | 0 | 1 | IMPOSSIBLE |
| | 12 | 3 | 2 | 0 | 1 | 1 | 1 | IMPOSSIBLE |
| | 13 | 3 | 3 | 0 | 0 | 0 | 1 | IMPOSSIBLE |
| | 14 | 3 | 3 | 0 | 0 | 1 | 1 | PATTERN No.1-36 |
| | 15 | 3 | 3 | 0 | 1 | 0 | 1 | IMPOSSIBLE |
| | 16 | 3 | 3 | 0 | 1 | 1 | 1 | IMPOSSIBLE |

Fig. 25C

| REGION No. | CONDITION No. | x shift | y shift | LOCATION OF $X_0$ ($X_0 > 0$) | LOCATION OF $X_1$ ($X_1 > 0$) | LOCATION OF $Y_0$ ($Y_0 > 0$) | LOCATION OF $Y_1$ ($Y_1 > 0$) | DETECTION RESULT |
|---|---|---|---|---|---|---|---|---|
| REGION 3 | 1 | 2 | 2 | 0 | 1 | 0 | 1 | PATTERN No.1~36 (REDUNDANT) |
| | 2 | 2 | 2 | 0 | 1 | 1 | 1 | PATTERN No.3,4,19~36 (REDUNDANT) |
| | 3 | 2 | 2 | 1 | 1 | 0 | 1 | PATTERN No.1~18, 21, 22 |
| | 4 | 2 | 2 | 1 | 1 | 1 | 1 | PATTERN No.3,4,21,22 |
| | 5 | 2 | 3 | 0 | 1 | 0 | 1 | IMPOSSIBLE |
| | 6 | 2 | 3 | 0 | 1 | 1 | 1 | PATTERN No.1~36 (REDUNDANT) |
| | 7 | 2 | 3 | 1 | 1 | 0 | 1 | IMPOSSIBLE |
| | 8 | 2 | 3 | 1 | 1 | 1 | 1 | PATTERN No.1~18, 21, 22 |
| | 9 | 3 | 2 | 0 | 1 | 0 | 1 | IMPOSSIBLE |
| | 10 | 3 | 2 | 0 | 1 | 1 | 1 | IMPOSSIBLE |
| | 11 | 3 | 2 | 1 | 1 | 0 | 1 | PATTERN No.1~36 (REDUNDANT) |
| | 12 | 3 | 2 | 1 | 1 | 1 | 1 | PATTERN No.3,4,19~36 |
| | 13 | 3 | 3 | 0 | 1 | 0 | 1 | IMPOSSIBLE |
| | 14 | 3 | 3 | 0 | 1 | 1 | 1 | IMPOSSIBLE |
| | 15 | 3 | 3 | 1 | 1 | 0 | 1 | IMPOSSIBLE |
| | 16 | 3 | 3 | 1 | 1 | 1 | 1 | PATTERN No.1~36 |

Fig. 25D

| REGION No. | CONDITION No. | x shift O | y shift I | LOCATION OF X0 (X0>0) | LOCATION OF X1 (X1>0) | LOCATION OF Y1 (Y1>0) | LOCATION OF Y2 (Y2>0) | DETECTION RESULT |
|---|---|---|---|---|---|---|---|---|
| REGION 4 | 1 | 2 | 2 | 0 | 0 | 0 | 0 | PATTERN No.1,2,19,36(REDUNDANT) |
| | 2 | 2 | 2 | 0 | 1 | 0 | 1 | PATTERN No.1~36 (REDUNDANT) |
| | 3 | 2 | 2 | 1 | 1 | 0 | 0 | PATTERN No.1, 2, 21, 22 |
| | 4 | 2 | 2 | 1 | 1 | 0 | 1 | PATTERN No.1~18, 21, 22 |
| | 5 | 2 | 3 | 0 | 1 | 0 | 0 | PATTERN No.1~36(REDUNDANT) |
| | 6 | 2 | 3 | 0 | 1 | 0 | 1 | IMPOSSIBLE |
| | 7 | 2 | 3 | 1 | 1 | 0 | 0 | PATTERN No. 1~18, 21, 22 |
| | 8 | 3 | 3 | 1 | 1 | 0 | 1 | IMPOSSIBLE |
| | 9 | 3 | 2 | 0 | 1 | 0 | 0 | IMPOSSIBLE |
| | 10 | 3 | 2 | 0 | 1 | 0 | 1 | IMPOSSIBLE |
| | 11 | 3 | 2 | 1 | 1 | 0 | 0 | PATTERN No. 1, 2, 19~36 |
| | 12 | 3 | 2 | 1 | 1 | 0 | 1 | PATTERN No. 1, 2, 19~36 |
| | 13 | 3 | 3 | 0 | 1 | 0 | 0 | IMPOSSIBLE |
| | 14 | 3 | 3 | 0 | 1 | 0 | 1 | PATTERN No.1~36 |
| | 15 | 3 | 3 | 1 | 1 | 0 | 0 | PATTERN No.1~36 |
| | 16 | 3 | 3 | 1 | 1 | 0 | 1 | IMPOSSIBLE |

Fig. 26 LOGIC CALCULATION  ($1/2 > p \geq 1/3$, $1 > q \geq 1/3$)

| SECTION | LOGIC CALCULATION |
|---|---|
| G1 | $A * \overline{P2} * \overline{P4} * \overline{P6} * \overline{P8} * \overline{P10} * \overline{P12} + P1 + P3 + P5 + P7 + P9 + P11$ |
| G2 | $B * \overline{P2} * \overline{P4} * \overline{P6} * \overline{P8} * \overline{P10} * \overline{P12} + P1 + P3 + P5 + P7 + P9 + P11$ |
| G3 | $C * \overline{P2} * \overline{P4} * \overline{P6} * \overline{P8} * \overline{P10} * \overline{P12} + P1 + P3 + P5 + P7 + P9 + P11$ |
| G4 | $D * \overline{P2} * \overline{P4} * \overline{P6} * \overline{P8} * \overline{P10} * \overline{P12} + P1 + P3 + P5 + P7 + P9 + P11$ |
| G5 | $A*(B*\overline{P8}*\overline{P10}*\overline{P12}+D*\overline{P2}*\overline{P4}*\overline{P6}+C)+B*C*P+P1+P3+P5+P7+P9+P11$ |
| G6 | $B*(A*\overline{P8}*\overline{P10}*\overline{P12}+C*\overline{P2}*\overline{P4}*\overline{P6}+D)+A*C*D+P1+P3+P5+P7+P9+P11$ |
| G7 | $C*(D*\overline{P8}*\overline{P10}*\overline{P12}+B*\overline{P2}*\overline{P4}*\overline{P6}+A)+A*B*D+P1+P3+P5+P7+P9+P11$ |
| G8 | $D*(C*\overline{P8}*\overline{P10}*\overline{P12}+A*\overline{P2}*\overline{P4}*\overline{P6}+B)+A*B*C+P1+P3+P5+P7+P9+P11$ |

P1 = U1 * (PATTERN 1) ·········· PATTERN 1 (Fig. 24)
P2 = U1 * (PATTERN 2) ·········· PATTERN 2 ( " )
P3 = U2 * (PATTERN 3) ·········· PATTERN 3 ( " )
P4 = U2 * (PATTERN 4) ·········· PATTERN 4 ( " )
P5 = U3 * (ODD No. PATTERNS OF 1~18) ········· ODD No. PATTERNS OF 1~18 (Fig. 24)
P6 = U3 * (EVEN No. PATTERNS OF 1~18) ········· EVEN No. PATTERNS OF 1~18 ( " )
P7 = V1 * (PATTERN 19) ·········· PATTERN 19 (Fig. 24)
P8 = V1 * (PATTERN 20) ·········· PATTERN 20 ( " )
P9 = V2 * (PATTERN 21) ·········· PATTERN 21 ( " )
P10 = V2 * (PATTERN 22) ·········· PATTERN 22 ( " )
P11 = V3 * (ODD No. PATTERNS OF 19~36) ········· ODD No. PATTERNS OF 19~36 (Fig. 24)
P12 = V3 * (EVEN No. PATTERNS No. OF 19~36) ········· EVEN No. PATTERNS OF 19~36 ( " )

U1 = 1  FOR PATTERN 1, PATTERN 2
U2 = 1  FOR PATTERN 3, PATTERN 4
U3 = 1  FOR PATTERNS 1~18
V1 = 1  FOR PATTERN 19, PATTERN 20
V2 = 1  FOR PATTERN 21, PATTERN 22
V3 = 1  FOR PATTERNS 19~36

DISTRIBUTION OF ORIGINAL PIXELS

DIVISION OF AREA

REFERENCE PIXELS

Fig. 31A

CONDITION FOR DETECTING PIXELS SUSCEPTIBLE TO DISAPPEARANCE $(1 > p \geq 1/2, 1 > q \geq 1/2)$

| REGION No. | CONDITION No. | x shift 1 | y shift 1 | LOCATION OF $X_1$ ($X_1 > 0$) | LOCATION OF $X_2$ ($X_2 > 0$) | LOCATION OF $Y_1$ ($Y_1 > 0$) | LOCATION OF $Y_2$ ($Y_2 > 0$) | DETECTION RESULT |
|---|---|---|---|---|---|---|---|---|
| | 1 | 1 | 1 | 0 | 0 | 0 | 0 | NO LINE SUSCEPTIBLE TO DISAPPEARANCE |
| | 2 | 1 | 1 | 0 | 0 | 0 | 1 | PATTERN No.1,2 |
| | 3 | 1 | 1 | 0 | 1 | 0 | 0 | PATTERN No.3,4 |
| | 4 | 1 | 1 | 0 | 1 | 0 | 1 | PATTERN No.1,2,3,4 |
| | 5 | 1 | 2 | 0 | 0 | 0 | 0 | PATTERN No.1,2 |
| | 6 | 1 | 2 | 0 | 0 | 0 | 1 | IMPOSSIBLE |
| REGION 1 | 7 | 1 | 2 | 0 | 1 | 0 | 0 | PATTERN No.1,2,3,4 |
| | 8 | 1 | 2 | 0 | 1 | 0 | 1 | IMPOSSIBLE |
| | 9 | 2 | 1 | 0 | 0 | 0 | 0 | PATTERN No.3,4 |
| | 10 | 2 | 1 | 0 | 0 | 0 | 1 | PATTERN No.1,2,3,4 |
| | 11 | 2 | 1 | 0 | 1 | 0 | 0 | IMPOSSIBLE |
| | 12 | 2 | 1 | 0 | 1 | 0 | 1 | IMPOSSIBLE |
| | 13 | 2 | 2 | 0 | 0 | 0 | 0 | PATTERN No.1,2,3,4 |
| | 14 | 2 | 2 | 0 | 0 | 0 | 1 | IMPOSSIBLE |
| | 15 | 2 | 2 | 0 | 1 | 0 | 0 | IMPOSSIBLE |
| | 16 | 2 | 2 | 0 | 1 | 0 | 1 | IMPOSSIBLE |

Fig.31B

| REGION No. | CONDITION No. | x shift 1 | y shift 0 | LOCATION OF X1 (X1>0) | LOCATION OF X2 (X2>0) | LOCATION OF Y0 (Y0>0) | LOCATION OF Y1 (Y1>0) | DETECTION RESULT |
|---|---|---|---|---|---|---|---|---|
| | 1 | 1 | 1 | 0 | 0 | 0 | 1 | PATTERN No.1,2 (REDUNDANT) |
| | 2 | 1 | 1 | 0 | 0 | 1 | 1 | NO LINE SUSCEPTIBLE TO DISAPPEARANCE |
| | 3 | 1 | 1 | 0 | 1 | 0 | 1 | PATTERN No.1,2,3,4 (REDUNDANT) |
| | 4 | 1 | 1 | 0 | 1 | 0 | 1 | PATTERN No.3,4 |
| | 5 | 1 | 2 | 0 | 0 | 0 | 1 | IMPOSSIBLE |
| | 6 | 1 | 2 | 0 | 0 | 1 | 1 | PATTERN No.1,2 |
| | 7 | 1 | 2 | 0 | 1 | 0 | 1 | IMPOSSIBLE |
| REGION 2 | 8 | 1 | 2 | 0 | 1 | 1 | 1 | PATTERN No.1,2,3,4 |
| | 9 | 2 | 1 | 0 | 0 | 0 | 1 | PATTERN No.1,2,3,4 (REDUNDANT) |
| | 10 | 2 | 1 | 0 | 0 | 0 | 1 | PATTERN No.3,4 |
| | 11 | 2 | 1 | 0 | 1 | 0 | 1 | IMPOSSIBLE |
| | 12 | 2 | 2 | 0 | 1 | 1 | 1 | IMPOSSIBLE |
| | 13 | 2 | 2 | 0 | 0 | 0 | 1 | IMPOSSIBLE |
| | 14 | 2 | 2 | 0 | 0 | 1 | 1 | PATTERN No.1,2,3,4 |
| | 15 | 2 | 2 | 0 | 1 | 0 | 1 | IMPOSSIBLE |
| | 16 | 2 | 2 | 0 | 1 | 1 | 1 | IMPOSSIBLE |

Fig. 31C

| REGION No. | CONDITION No. | x shift 0 | y shift 0 | LOCATION OF $X_0$ ($X_0>0$) | LOCATION OF $X_1$ ($X_1>0$) | LOCATION OF $Y_0$ ($Y_0>0$) | LOCATION OF $Y_1$ ($Y_1>0$) | DETECTION RESULT |
|---|---|---|---|---|---|---|---|---|
| | 1 | 1 | 1 | 0 | 1 | 0 | 1 | PATTERN No.1,2,3,4 (REDUNDANT) |
| | 2 | 1 | 1 | 0 | 1 | 1 | 1 | PATTERN No.3,4 (REDUNDANT) |
| | 3 | 1 | 1 | 1 | 1 | 0 | 1 | PATTERN No.1,2 (REDUNDANT) |
| | 4 | 1 | 1 | 1 | 1 | 1 | 1 | NO LINE SUSCEPTIBLE TO DISAPPEARANCE |
| | 5 | 1 | 2 | 0 | 1 | 0 | 1 | IMPOSSIBLE |
| | 6 | 1 | 2 | 0 | 1 | 1 | 1 | PATTERN No.1,2,3,4 (REDUNDANT) |
| REGION 3 | 7 | 1 | 2 | 1 | 1 | 0 | 1 | IMPOSSIBLE |
| | 8 | 1 | 2 | 1 | 1 | 1 | 1 | PATTERN No.1,2 |
| | 9 | 2 | 1 | 0 | 1 | 0 | 1 | IMPOSSIBLE |
| | 10 | 2 | 1 | 0 | 1 | 1 | 1 | IMPOSSIBLE |
| | 11 | 2 | 1 | 1 | 1 | 0 | 1 | PATTERN No.1,2,3,4 (REDUNDANT) |
| | 12 | 2 | 1 | 1 | 1 | 1 | 1 | PATTERN No.3,4 |
| | 13 | 2 | 2 | 0 | 1 | 0 | 1 | IMPOSSIBLE |
| | 14 | 2 | 2 | 0 | 1 | 1 | 1 | IMPOSSIBLE |
| | 15 | 2 | 2 | 1 | 1 | 0 | 1 | IMPOSSIBLE |
| | 16 | 2 | 2 | 1 | 1 | 1 | 1 | PATTERN No.1,2,3,4 |

Fig. 31D

| REGION No. | CONDITION No. | x shift 0 | y shift 1 | LOCATION OF X0 (X0>0) | LOCATION OF X1 (X1>0) | LOCATION OF Y1 (Y1>0) | LOCATION OF Y2 (Y2>0) | DETECTION RESULT |
|---|---|---|---|---|---|---|---|---|
| | 1 | 1 | 1 | 0 | 0 | 0 | 0 | PATTERN No.3,4 (REDUNDANT) |
| | 2 | 1 | 1 | 0 | 1 | 0 | 1 | PATTERN No.1,2,3,4 (REDUNDANT) |
| | 3 | 1 | 1 | 1 | 1 | 0 | 0 | NO LINE SUSCEPTIBLE TO DISAPPEARANCE |
| | 4 | 1 | 1 | 1 | 1 | 0 | 1 | PATTERN No.1,2 |
| | 5 | 1 | 2 | 0 | 1 | 0 | 0 | PATTERN No.1,2,3,4 (REDUNDANT) |
| REGION 4 | 6 | 1 | 2 | 0 | 1 | 0 | 1 | IMPOSSIBLE |
| | 7 | 1 | 2 | 1 | 1 | 0 | 0 | PATTERN No.1,2 |
| | 8 | 1 | 2 | 1 | 1 | 0 | 1 | IMPOSSIBLE |
| | 9 | 2 | 1 | 0 | 1 | 0 | 0 | IMPOSSIBLE |
| | 10 | 2 | 1 | 0 | 1 | 0 | 1 | IMPOSSIBLE |
| | 11 | 2 | 1 | 1 | 1 | 0 | 0 | PATTERN No.3,4 |
| | 12 | 2 | 1 | 1 | 1 | 0 | 1 | PATTERN No.1,2,3,4 |
| | 13 | 2 | 2 | 0 | 1 | 0 | 0 | IMPOSSIBLE |
| | 14 | 2 | 2 | 0 | 1 | 0 | 1 | IMPOSSIBLE |
| | 15 | 2 | 2 | 1 | 1 | 0 | 0 | PATTERN No.1,2,3,4 |
| | 16 | 2 | 2 | 1 | 1 | 0 | 1 | IMPOSSIBLE |

Fig. 32

DIVISION INTO SECTIONS

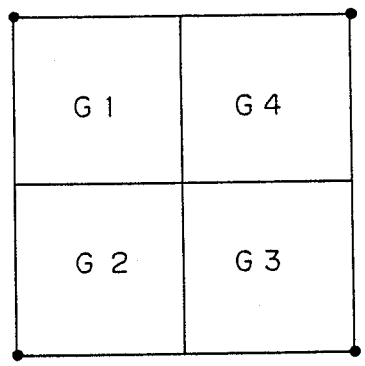

LOGIC CALCULATION

| SECTION | LOGIC CALCULATION |
|---|---|
| G 1 | $A * \overline{P2} * \overline{P4} + P1 + P3$ |
| G 2 | $B * \overline{P2} * \overline{P4} + P1 + P3$ |
| G 3 | $C * \overline{P2} * \overline{P4} + P1 + P3$ |
| G 4 | $D * \overline{P2} * \overline{P4} + P1 + P3$ |

$$\begin{Bmatrix} U1 = 1 \quad \text{FOR PATTERN 1, PATTERN 2} \\ V1 = 1 \quad \text{FOR PATTERN 3, PATTERN 4} \\ P1 = U1 * (\text{PATTERN 1}) \quad (\text{Fig.11}) \\ P2 = U1 * (\text{PATTERN 2}) \quad ( \text{″} \quad ) \\ P3 = V1 * (\text{PATTERN 3}) \quad ( \text{″} \quad ) \\ P4 = V1 * (\text{PATTERN 4}) \quad ( \text{″} \quad ) \end{Bmatrix}$$

| Fig. 33A | Fig. 33B | Fig. 33C |

APPARATUS STRUCTURE
(R — REGISTER, SR — SHIFT REGISTER)

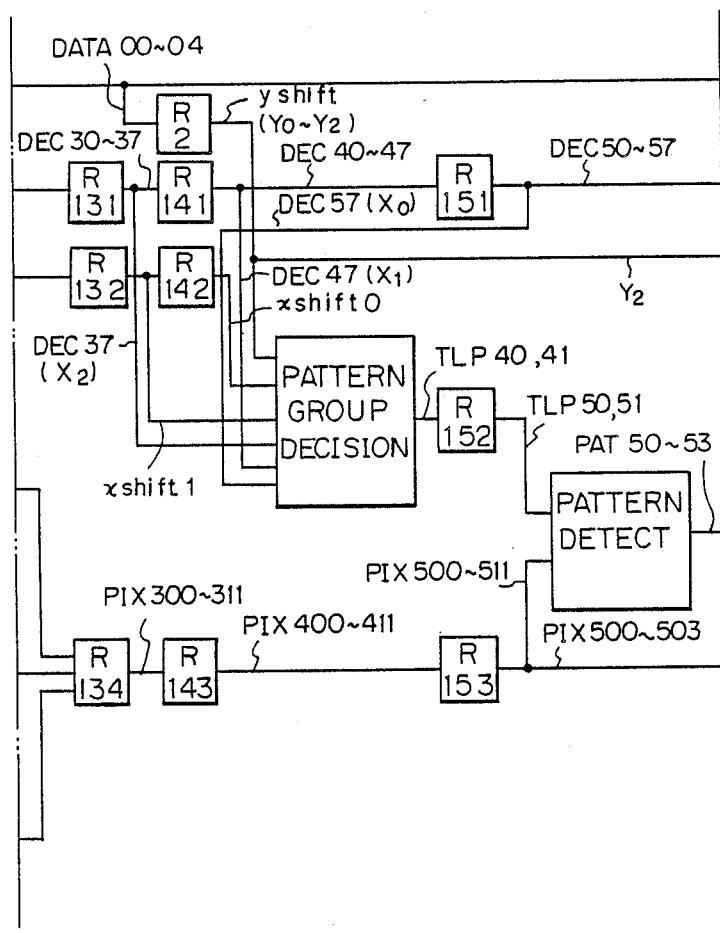
Fig. 33·B

Fig. 34B

OPERATION EXAMPLE

|  | $T_{10}$ | $T_{11}$ |  |  |  |  |  |  |  |  |  |  | $T_{17}$ | $T_{22}$ |
|---|---|---|---|---|---|---|---|---|---|---|---|---|---|---|
| EARLIER | ⇨ | ⇨ | ⇨ | ⇨ | ⇨ | ⇨ | ⇨ | ⇨ | ⇨ | ⇨ | ⇨ | ⇨ | ⇨ | ⇨ LATER |

|  | $S_{00}$ | $S_{01}$ | $S_{02}$ | | | | | | | | | | | |
| LINE 1 | 15 | 14 | 13 | 12 | 11 | 10 | 09 | 08 | 07 | 06 | 05 | 04 | 03 | 02 | 01 | 00 |
|  | $S_{10}$ | $S_{11}$ | $S_{12}$ | | | | | | | | | | | |
| LINE 2 | 15 | 14 | 13 | 12 | 11 | 10 | 09 | 08 | 07 | 06 | 05 | 04 | 03 | 02 | 01 | 00 |
|  | $S_{20}$ | $S_{21}$ | $S_{22}$ | | | | | | | | | | | |
| LINE 3 | 15 | 14 | 13 | 12 | 11 | 10 | 09 | 08 | 07 | 06 | 05 | 04 | 03 | 02 | 01 | 00 |

OPERATION EXAMPLE

PROCESS AND APPARATUS FOR REDUCING A PICTURE WITH FINE LINE DISAPPEARANCE PREVENTION

BACKGROUND OF THE INVENTION

1. Field of the Invention

The present invention relates to a process and an apparatus for reducing a picture with prevention of fine line disappearance. The process and apparatus according to the present invention are applicable to facsimile picture transmission.

2. Description of the Related Art

In general, the reduction or enlargement of a picture is carried out in the conversion of the concentration of picture pixels in connection with the conversion between different facsimile transmission types, such as G3 and G4 prescribed by CCITT standards.

In the prior art, a high speed projection method type picture reduction is used in which the determination of monochrome pixel data, i.e., whether a pixel is black or white, of a reduced picture is carried out by a logic calculation of basic data. In the high speed projection type method, an area of the original picture is divided into sections, a logic calculation formula is provided for each of these sections, and a logic calculation is carried out for each of the reduced picture pixels according to the logic calculation formula so that the monochrome pixel data of the reduced picture is determined.

However, in the prior art picture reduction process, such as the high speed projection method type picture reduction process, there is a problem of a disappearance of fine lines. That is, a vertical line having a width of less than 1/p where p is the reduction rate along the X-axis, and a horizontal line having a width of less than 1/q where q is the reduction rate along the Y-axis, will disappear in the reduction process. This causes a serious disadvantage in the picture reduction in the technique of the conversion of the concentration of picture pixels in connection with the conversion between different facsimile transmission types.

SUMMARY OF THE INVENTION

It is an object of the present invention to provide an improved process and apparatus for reducing a picture in which the disappearance of fine lines is prevented to achieve a reliable and satisfactory picture reduction.

In accordance with the fundamental aspect of the present invention, there is provided a process for reducing a picture by determining monochrome data of converted picture pixels according to logic calculations based on monochrome data of original picture pixels by using divisional regions of a picture area according to a reduction rate, for avoiding the disappearance of fine lines from the converted picture. The process includes the steps of:

successively receiving monochrome data of original picture pixels in the vicinity of a converted picture pixel;

producing data of a line susceptible to disappearance which is necessary for detecting pixels along a line in the converted picture which could disappear from the converted picture due to picture conversion;

discriminating regions in which the converted picture pixel are located;

calculating monochrome data of a converted picture pixel based on the data generated in relation to the lines susceptible to disappearance, discrimination data of regions in which the converted picture pixels are located, and monochrome data of the original picture pixels; and producing a signal indicating the monochrome data of the converted picture pixel according to the calculation of monochrome data of the converted picture pixel.

BRIEF DESCRIPTION OF THE DRAWINGS

In the drawings,

FIG. 1 illustrates the basic method of reduction of a picture;

FIG. 2 illustrates a division into sections in a plane of a picture;

FIG. 3 shows an equation defining a curve dividing sections;

FIG. 4 shows a logic calculation table for the sections of FIG. 2;

FIG. 8 illustrates a location of a reduced picture pixel;

FIG. 9 illustrates a division of an area into regions in relation with the condition of detection of pixels which are susceptible to disappearance;

FIGS. 11A and 11B illustrate patterns of fine line disappearance;

FIGS. 12A to 12D show a table of the condition for detecting pixels which are susceptible to disappearance;

FIGS. 13A to 13C show sections and a logic calculation table for an apparatus for carrying out a process of reducing a picture according to an embodiment of the present invention;

FIG. 15 shows a fine line pattern susceptible to disappearance with a ratio of $\frac{1}{2} > p \geq \frac{1}{3}$ for a line width of one unit;

FIG. 19 illustrates a method of division into regions used in the apparatus of FIG. 17;

FIG. 20 illustrates an assumption of reference pixels in the apparatus of FIG. 17;

FIGS. 21A to 21D show a table of the conditions for detecting a disappearance of pixels similar to FIGS. 12A to 12D;

FIG. 22 shows a table of the logic calculations for the apparatus of FIG. 17;

FIGS. 24A to 24D illustrate basic patterns of fine line disappearance in relation with the apparatus of FIG. 17;

FIGS. 25A to 25D show a table of the conditions for detecting a disappearance of pixels to be converted as the basis of the operation of the apparatus of FIG. 17;

FIG. 26 shows a table of logic calculations used in the operation of the apparatus of FIG. 17;

FIGS. 31A to 31D show a table of the conditions for detecting disappearance of pixels similar to FIGS. 12A to 12D;

FIG. 32 shows a table of the logic calculations used in the operation of the apparatus of FIG. 27.

FIGS. 33A, 33B, and 33C show an example of the structure of an apparatus for carrying out a process of reducing a picture according to an embodiment of the present invention; and FIGS. 34A, 34B, and 34C illustrate an example of the operation of an apparatus for carrying out a process of reducing a picture according to an embodiment of the present invention.

DESCRIPTION OF THE PREFERRED EMBODIMENTS

Principle of a Process According to Present Invention

Before describing preferred embodiments of the present invention, the principle of a process according to the present invention will be described with reference to FIG. 1 to FIG. 12.

An analysis of the reduction of a picture is illustrated in FIG. 1. It is assumed that each of pixel of a picture is represented by a monochrome (i.e., black or white) dot placed at the center of the pixel. In the reduction shown in FIG. 1, four original picture pixels represented as black dots along X-axis direction are converted into three reduced picture pixels represented as crosses along the X-axis direction. Thus, the reduction rate p along X-axis is $p = \frac{3}{4}$. Similarly, the reduction rate q along the Y-axis is $q = \frac{3}{4}$. It is assumed that the distance between the adjacent original picture pixels along X-axis is 1. Thus the distance between the adjacent reduced picture pixels the along X-axis is $1/p$. Similarly, the distance between the adjacent original picture pixels along the Y-axis is 1, and the distance between the adjacent reduced picture pixels along the Y-axis is $1/q$.

$P_a$ is the number of pixels per line in the original picture along the X-axis direction, and $P_b$ is the number of pixels per line in the original picture along the Y-axis direction.

The X and Y coordinates of the beginning pixel point of the reduced picture pixels are as follows.

$$X \text{ coordinate} - X_0 = \frac{1}{2}\left\{ (P_a - 1) - \left(\frac{P_a}{P_b}\right)(P_b - 1) \right\}$$

$$Y \text{ coordinate} - Y_0 = \frac{1}{2}\left\{ (Q_a - 1) - \left(\frac{Q_a}{Q_b}\right)(Q_b - 1) \right\}$$

By changing the original coordinates, the X and Y coordinates are as follows.

$$X\text{-coordinate} - X_0 - \frac{1}{2}$$

$$Y\text{-coordinate} - Y_0 - \frac{1}{2}$$

The division into sections is illustrated in FIG. 2. In FIG. 2, the area defined by four original picture pixels A, B, C, and D is divided into eight sections $G_1$, $G_2$, $G_3$, $G_4$, $G_5$, $G_6$, $G_7$, and $G_8$. Hyperbola curves are used to divide the sections. The definition of the curve is given by an equation $(px + 0.5)(qy + 0.5) = 0.5$ as shown in FIG. 3.

A process of picture reduction of a high speed projection type has been known in which the logic calculation is carried out using a logic calculation table shown in FIG. 4.

However, in the process for reducing a picture, it was recognized that there is a problem of disappearance of fine lines in the reduction of an original picture into a reduced picture. The possibility of disappearance of fine lines in the reduction of an original picture will be explained with reference to FIGS. 5 to 10.

Figure 5:
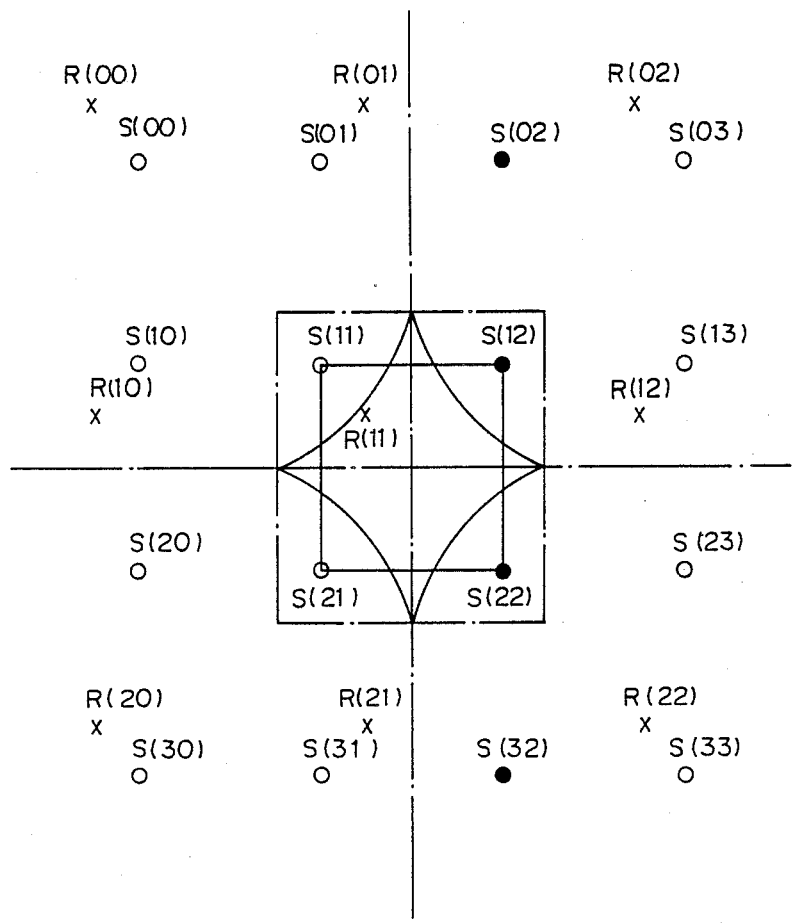
FIG. 5 illustrates basic fine line disappearance in a reduction of a picture.

In FIG. 5, S(00), S(10), S(20), S(30), S(01), S(11), S(21), S(31), S(03), S(13), S(23), and S(33) represent white pixels of the original picture, S(02), S(12), S(22), and S(32) represent black pixels of the original picture, and R(00), R(10), R(20), R(30), R(01), R(11), R(21), R(02), R(12), R(22), and R(22) represent pixels of the reduced picture.

In FIG. 5, the monochrome data of reduced picture pixels R(11), R(21), R(12) and R(22) are in the vicinity of original picture black pixels S(12), S(22), and S(32) which constitute a fine black line in the original picture, for example. Because R(11) is located in section G5 in FIG. 2, the logic calculation $A*(B+C+D)+B*C*D$ for G5, as shown in FIG. 4, is carried out to produce the calculation result of white ("0") for R(11). Similarly, the calculation results for R(21), R(12), and R(22) are all white ("0"). This shows that the black information of S(12), S(22), and S(32) of the original picture is not reproduced in the corresponding region of the reduced picture, and thus the vertical fine black line constituted by S(12), S(22), and S(32) disappears in the reduced picture. The situation is similar in the case of a horizontal fine black line.

Thus, there has been a problem that a vertical line having a width of less than $1/p$ and a horizontal line having a width of less than $1/q$, where p and q are reduction rates in X-axis and Y-axis directions in the original picture, are susceptible to disappearance in the reduced picture.

Figure 6:
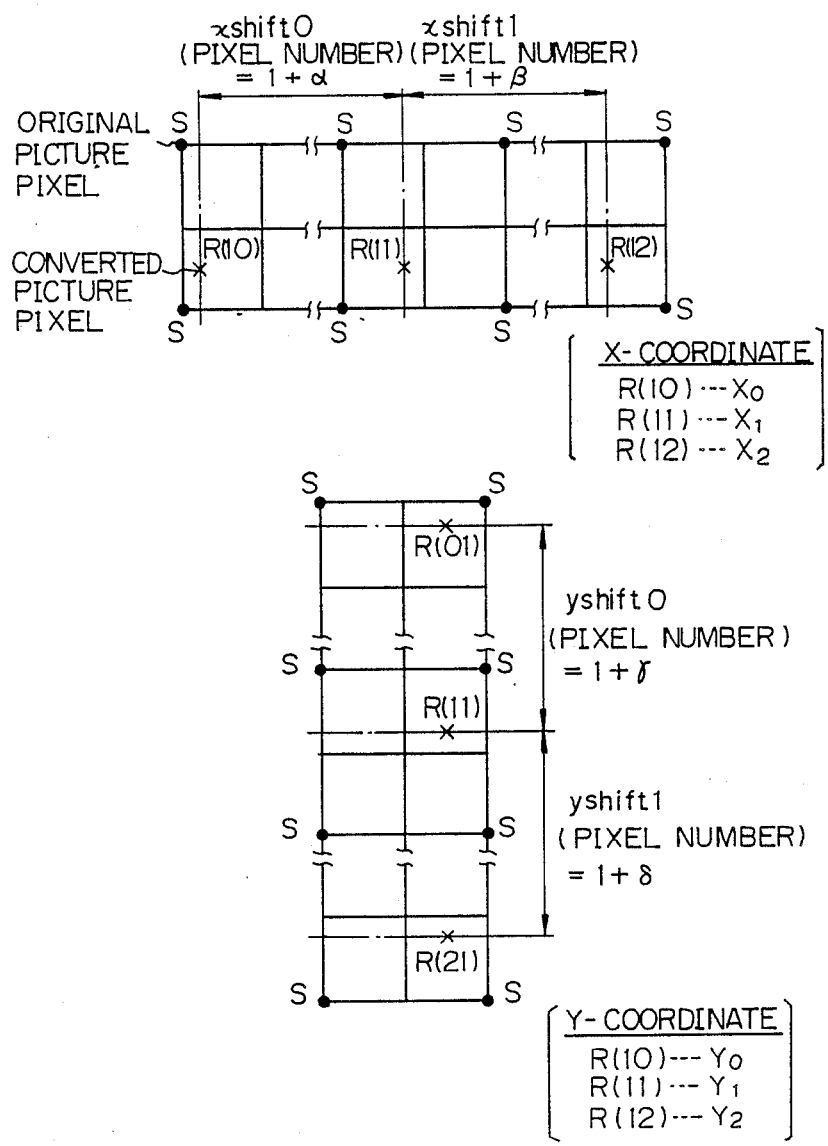
FIG. 6 illustrates the distribution of original picture pixels with respect to reduced picture pixels.

In FIG. 6, a distribution of original picture pixels with respect to reduced picture pixels is shown. $X_0$ represents the X-coordinate of the preceding reduced picture pixel R(10), $X_1$ represents the X-coordinate of the present reduced picture pixel R(11), and $X_2$ represents the X-coordinate of the subsequent reduced picture pixel R(12). xshift0 represents the number of original picture pixels between R(11) and R(10), and xshift1 represents the number of original picture pixels between R(11) and R(12).

$Y_0$ represents the Y-coordinate of the preceding reduced picture pixel R(01), $Y_1$ represents the Y-coordinate of the present reduced picture pixel R(11), and $Y_2$ represents the Y-coordinate of the subsequent reduced picture pixel R(21). yshift0 represents the number of original picture pixels between R(11) and R(01), and yshift1 represents the number of original picture pixels between R(11) and R(21).

Figure 7:
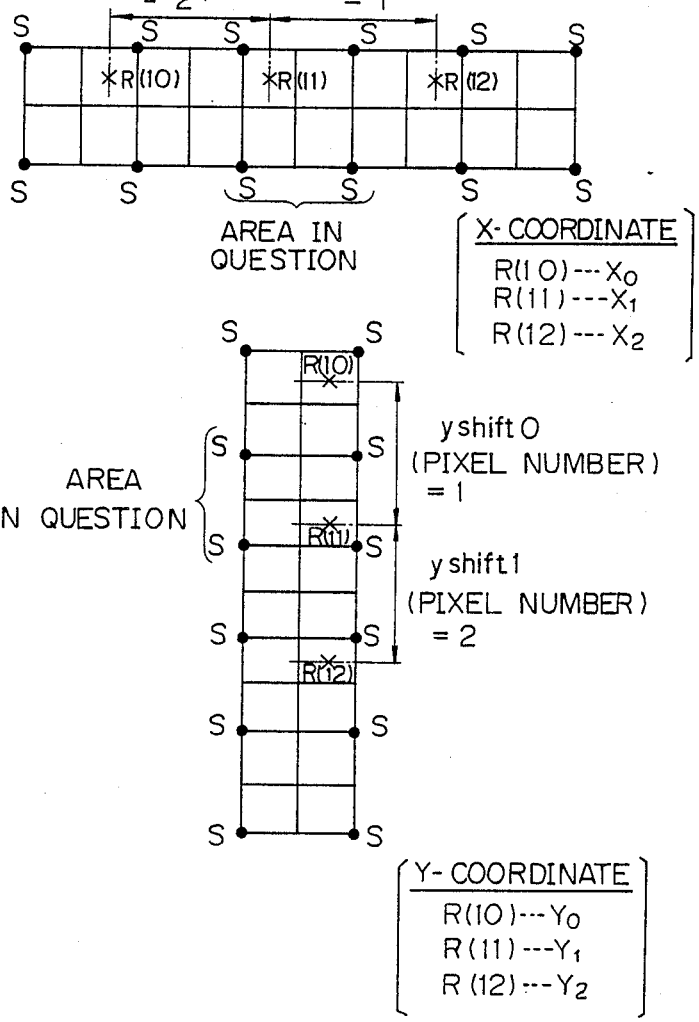
FIG. 7 shows an example of distribution of original picture pixels.

In FIG. 7, an example of distribution of original picture pixels is shown as the basis of the table of the condition for detecting pixels susceptible to disappearance shown in FIGS. 12A to 12D. In the upper pattern of FIG. 7, the pixel number xshift0 is equal to 2, and the pixel number xshift1 is equal to 1. With respect to the area in question, the position of R(11) is in the second (left) half ("0") in the x-axis direction (FIG. 8).

In the lower pattern of FIG. 7, the pixel number yshift0 is equal to 1, and the pixel number yshift1 is equal to 2. With respect to the area in question, the position of R(11) is in the lower half ("1") in the Y-axis direction (FIG. 8).

Figure 10:
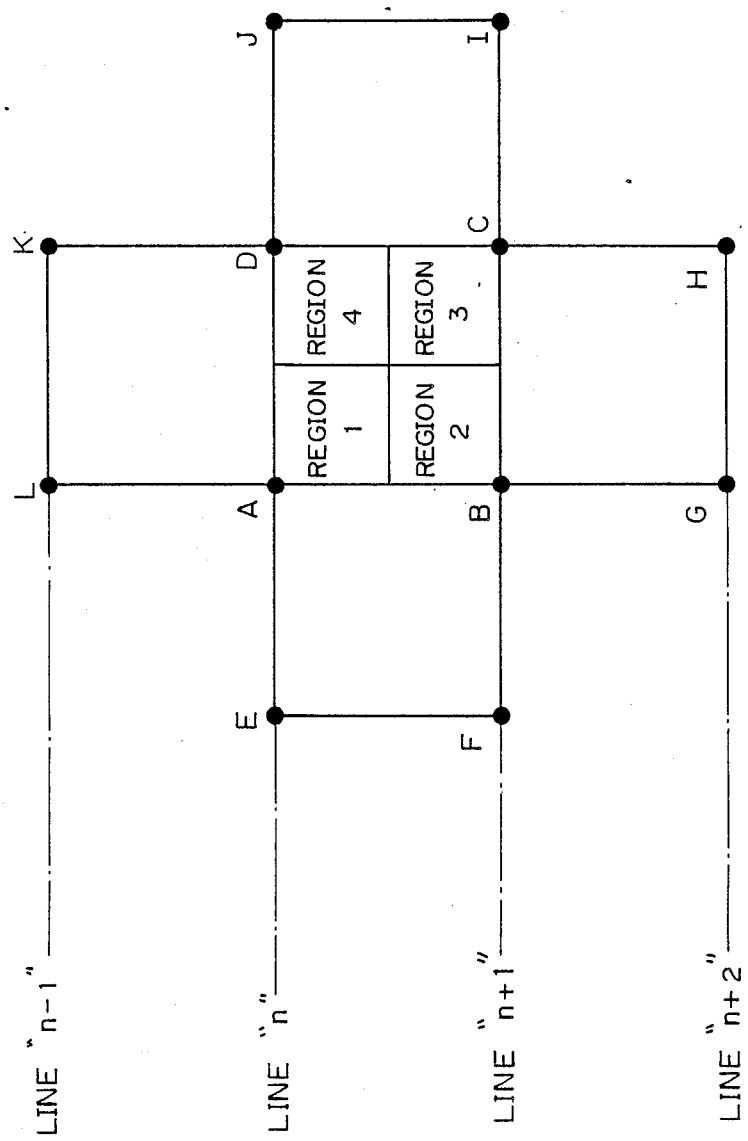
FIG. 10 illustrates reference pixels in relation with the condition of detection of disappearable pixels which are susceptible to disappearance.

In FIG. 9, a division of the area formed by pixels A, B, C, and D into four regions 1 to 4 in relation with the condition of detection of pixels susceptible to disappearance is illustrated. In FIG. 10, the reference pixels in relation to the condition of detection of pixels susceptible to disappearance is illustrated.

Figure 11B:
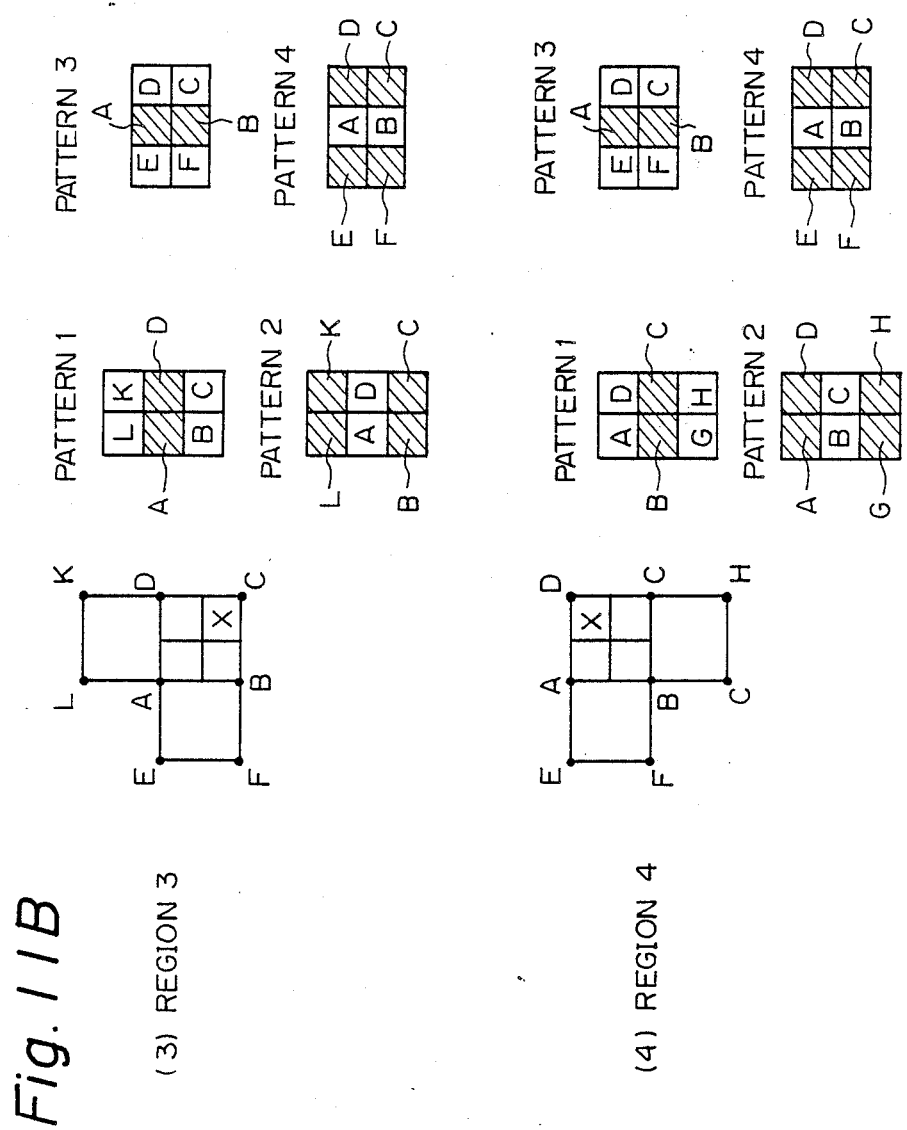

In FIGS. 11A and 11B, the patterns of fine line disappearance in correspondence with regions 1 to 4 are illustrated. In the patterns, hatched portions are black portions.

As a basis of a process according to the present invention, a table of conditions for detecting pixels susceptible to disappearance will be explained with reference to FIGS. 12A to 12D. For example, in FIG. 12A, columns are provided for the region number, the condition number, the number xshift1 of pixels, the number yshift1 of pixels, the present converted (reduced) picture pixel position ($X_1$), the subsequent converted picture pixel position ($X_2$), the present converted picture pixel position ($Y_1$), the subsequent converted picture pixel position ($Y_2$), and the determination of the fine line susceptible to disappearance. The table of FIGS. 12A to 12D should be interpreted in relation with FIGS. 6 to 11B.

Figure 14A:
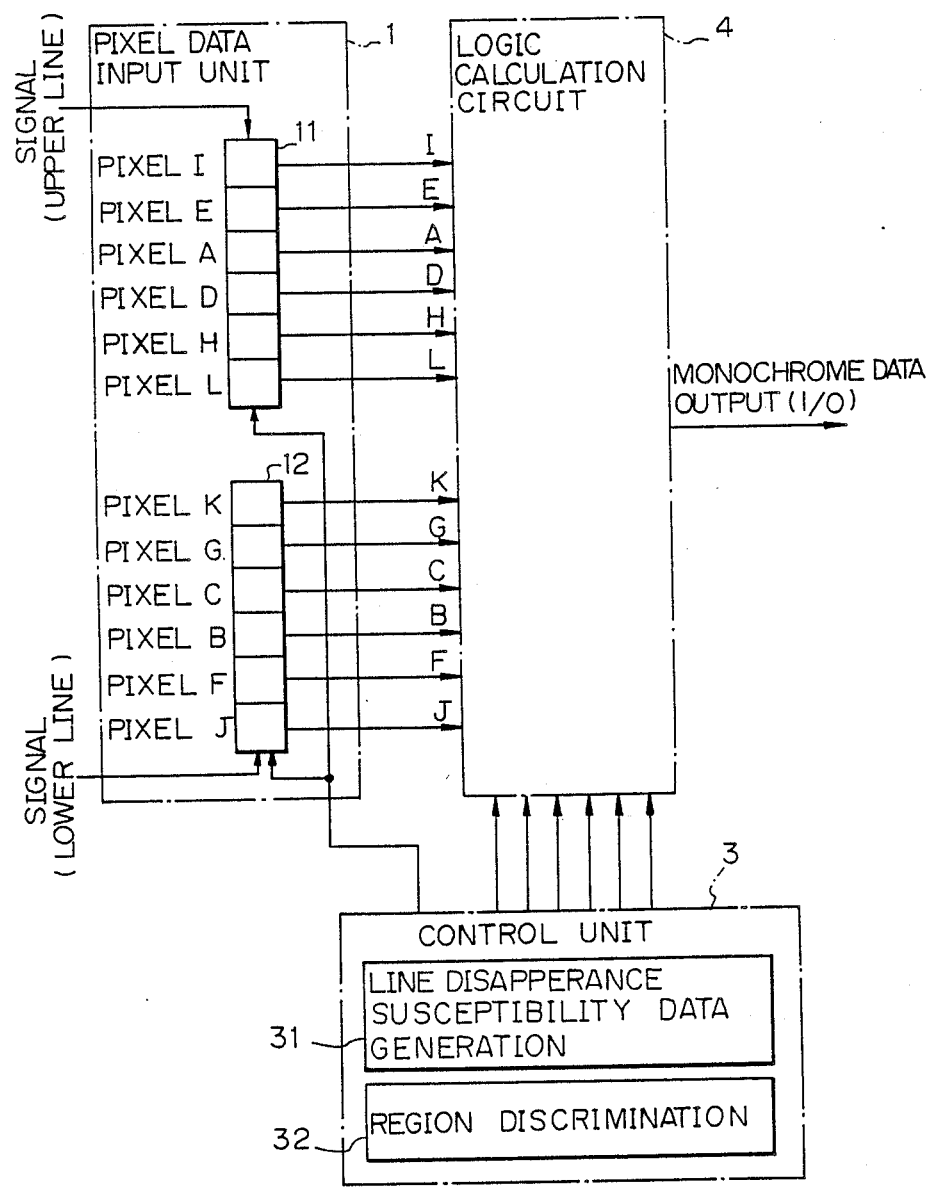
FIGS. 14A and 14B are schematic diagrams of an apparatus for carrying out a process of reducing a picture according to the embodiment of the present invention shown in FIGS. 13A to 13C.
Figure 14B:
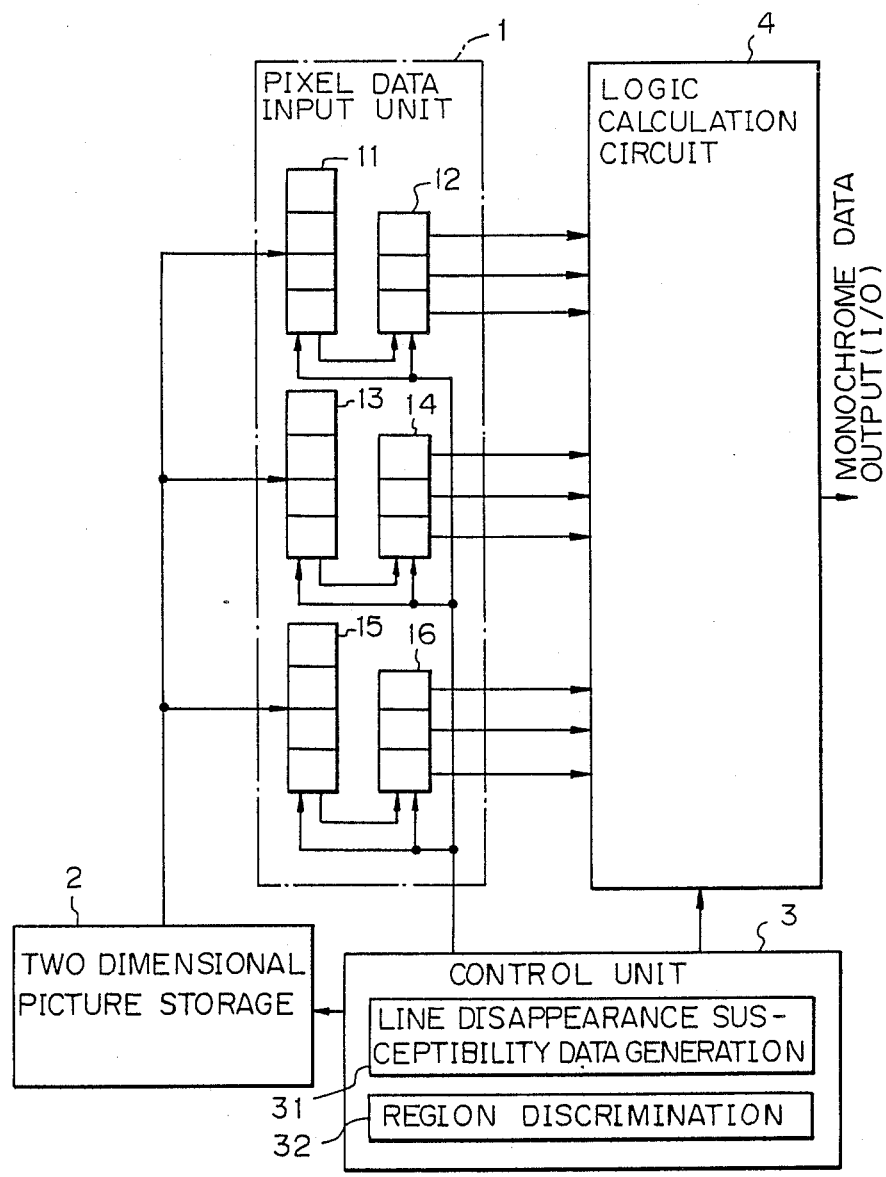

As another basis of a process according to the present invention, logic calculation tables for the calculation in the monochrome calculation circuit of the apparatus for carrying out the process according to an embodiment of the present invention shown in FIGS. 14A and 14B are shown in FIG. 13B.

FIGS. 14A, 14B Embodiment

An apparatus for carrying out a process of reducing a picture according to an embodiment of the present invention is shown in FIGS. 14A and 14B. FIG. 14A is an illustration in a simplified form showing the structure for X-axis direction, and FIG. 14B is an illustration in a more detailed form showing the structure for X- and Y-axis directions. The apparatus of FIGS. 14A and 14B, is of the high speed projection method type and uses a division of 8 sections. In the apparatus of FIGS. 14A and 14B, the reduction rate of, for example, $1 > p > \frac{1}{2}$ is used.

The apparatus of FIG. 14A includes a pixel data input unit 1 having a shift register 11 and a shift register 12, a control unit 3 having a line disappearance susceptibility data generation portion 31 and a region discrimination portion 32, and a logic calculation circuit 4.

The shift register 11 receives a sequence of signals of original picture pixels of an upper line of an original picture pixel group, and holds the received signal sequence by a shifting operation. The shift register 12 receives a sequence of signals of original picture pixels of a lower line of an original picture pixel group, and holds the received signal sequence by a shifting operation.

Elements I, E, A, D, H, L and elements K, G, C, B, F, J of the shift registers 11 and 12 correspond to positions of original picture pixels I, E, A, D, H, L, J, F, B, C, G, and K shown in FIG. 15.

In the control unit 3, the data of lines susceptible to disappearance is generated and the regions are discriminated based on the reduction factors p and q.

The operation of the control unit 3 is carried out in accordance with the tables of FIGS. 12A to 12D showing the condition for detecting the pixels susceptible to disappearance for the case where $1 > p \geq \frac{1}{2}$, $1 > q \geq \frac{1}{2}$.

In the tables of FIGS. 12A to 12D, xshift0 represents the number of original picture pixels between $R_{11}$ and $R_{10}$, and xshift1 represents the number of original picture pixels between $R_{11}$ and $R_{12}$. In the columns of "1" or "0" indication for converted picture pixel positions, "1" indicates that the converted picture pixel position is situated in the first half (right side in X-direction, lower side in Y-direction) of the region in question, and "0" indicates that the converted picture pixel position is situated in the second half (left side in X-direction, upper side in Y-direction of the region in question, as will be understood from FIG. 7 and FIG. 8.

In the logic calculation circuit 4, the logic calculation is carried out in accordance with the table shown in FIG. 13B and the table shown in FIG. 13C. The table of FIG. 13B is for a ratio of $1 > p > \frac{1}{2}$ and $1 > q \geq \frac{1}{2}$, and the table of FIG. 13C is for a ratio of $\frac{1}{2} > p \geq \frac{1}{3}$ and $\frac{1}{2} > q \geq \frac{1}{3}$.

In the case where $1 > p \geq \frac{1}{2}$, it is possible that the disappearance of one line will occur, and in the case where $\frac{1}{2} > p \geq \frac{1}{3}$, it is possible that the disappearance of one or two lines will occur.

The discrimination of regions in the region discrimination portion 32 of the control unit 3 is carried out in accordance with a discrimination based on the curve definition shown in FIG. 3 in relation to FIG. 2.

It is assumed that the pixels of the original picture are located as shown in FIG. 5 in which the monochrome data of original picture pixels S(02), S(12), S(22), and S(32) are all black, and the monochrome data of the other original picture pixels are all white. Black is represented as "1", and white is represented as "0", and it is assumed that the present converted picture pixel is R(11).

It is discriminated that the converted picture pixel R(11) is surrounded by the four adjacent original picture pixels S(11), S(21), S(22), and S(12) and the converted picture pixel R(11) belongs to range (section) G5.

The information that R(11) is located in the second half of the region, R(12) is located in the first half of the region, and the number of pixels xshift1 is equal to one, is supplied from the control unit 3 to the logic calculation circuit 4.

In the logic calculation circuit 4, the monochrome data of the converted picture pixel R(11) is calculated in accordance with the table shown in FIG. 12A based on the information of the location of R(11), that is G5, and the information of the monochrome data of the original picture pixels.

Figure 16:
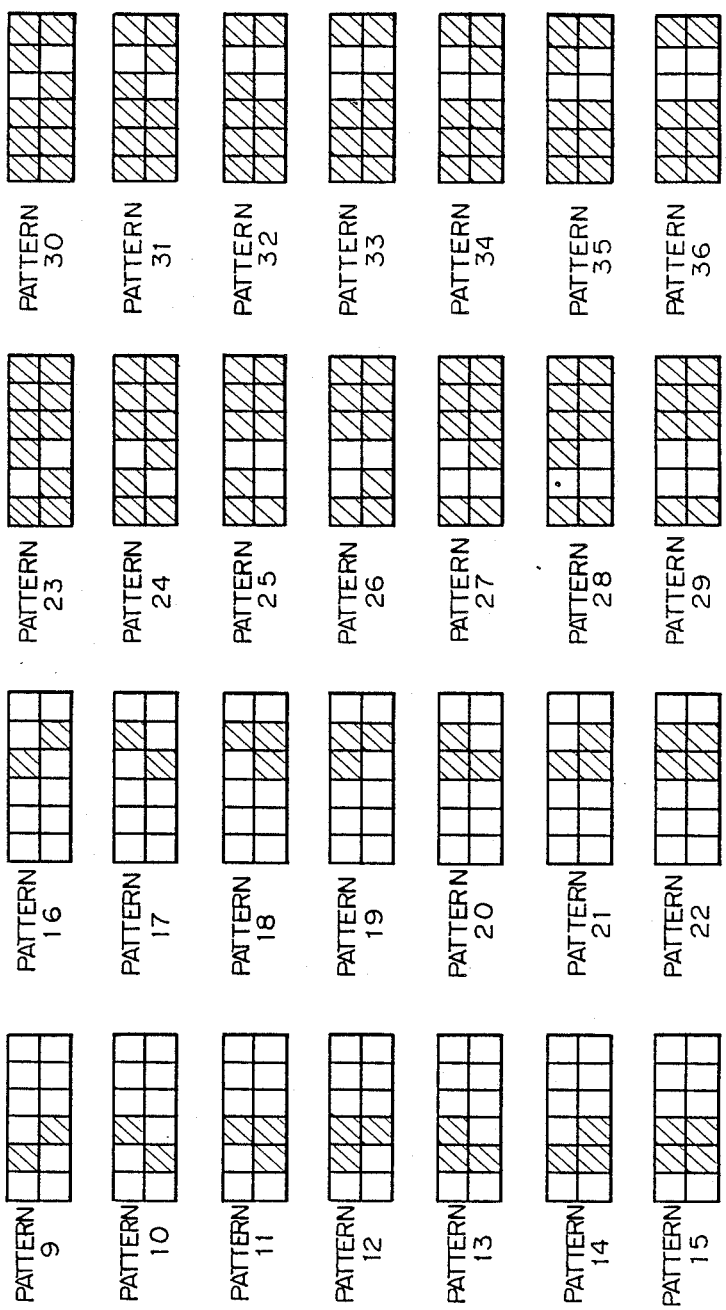
FIG. 16 shows a fine line pattern susceptible to disappearance with a ratio of $\frac{1}{2} > p \geq \frac{1}{3}$ for a line width of two units.

The fine line patterns for a line width of one unit and the reduction rate of $\frac{1}{2} > p \geq \frac{1}{3}$ are shown in FIG. 15, and those for a line width of two units and, the reduction rate of $\frac{1}{2} > p \geq \frac{1}{3}$ are shown in FIG. 16.

Although in the above, the description is given mainly for the X-axis direction, the process according to the present invention is carried out in the same manner for the Y-axis direction.

Although in the above, the description is given mainly for the reduction rate $1 > p \geq \frac{1}{3}$ and $1 > q \geq \frac{1}{3}$, the process according to the present invention can be carried out in a similar manner for a reduction rate outside the range of the above-mentioned reduction rate.

Heretofore, the descriptions are made for the case of the disappearance of a black fine line in a white background. However, it will be easily understood that the situation is similar for the case of the disappearance of a white fine line in a black background, and the above-described techniques can be applied similarly to the latter case.

FIG. 17 Embodiment

Figure 17:
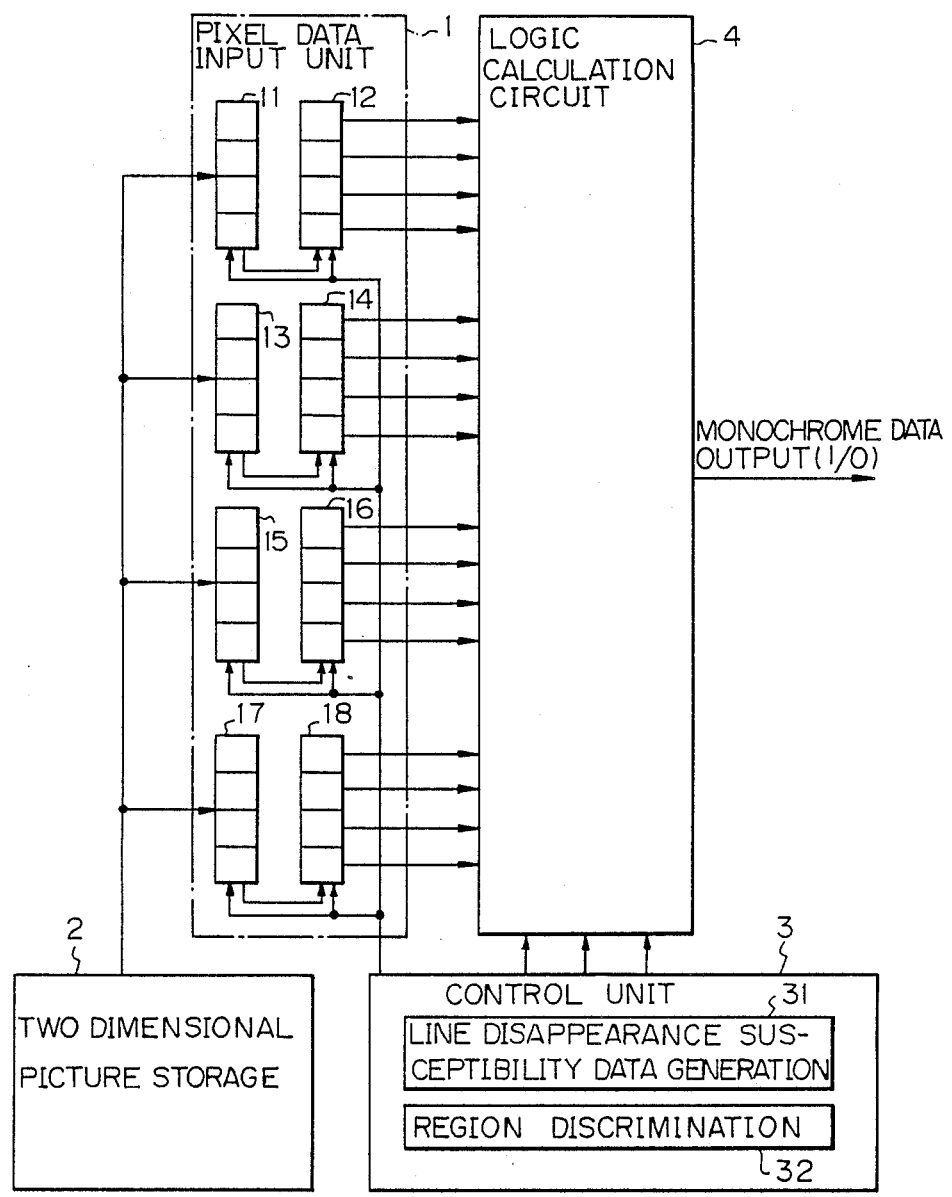
FIG. 17 is a schematic diagram of an apparatus for carrying out a process for reducing a picture according to a modified version of the embodiment of the present invention shown in FIGS. 13A to 13C.
Figure 18:
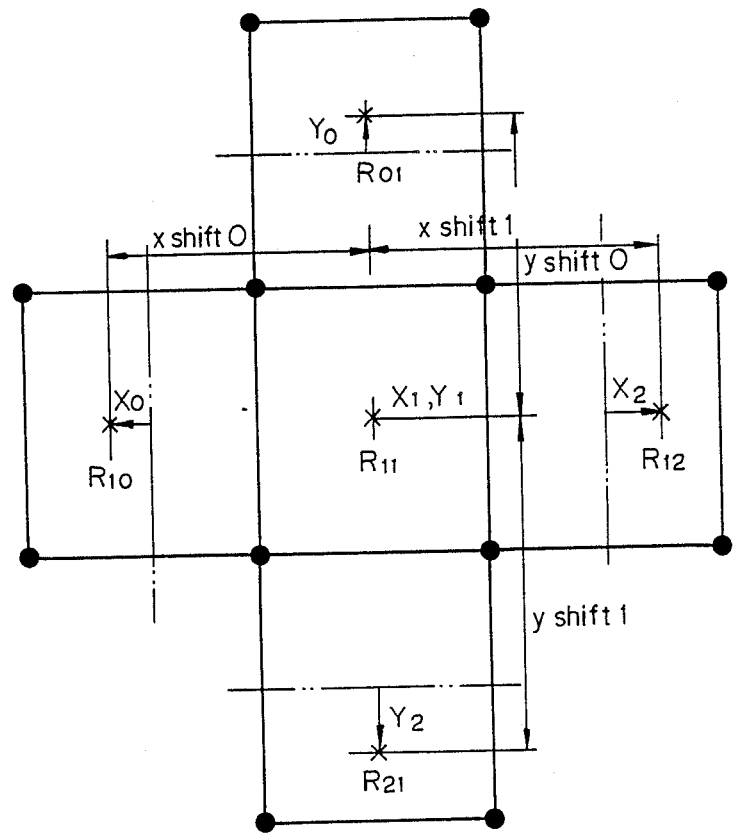
FIG. 18 illustrates the distribution of original picture pixels similar to FIG. 6.

An apparatus for carrying out a process for reducing a picture according to a modified version of the above-described embodiment of the present invention is shown in FIG. 17. The apparatus of FIG. 17 is of the high speed projection method type and uses the division of 4 sections. In the apparatus of FIG. 17, the reduction rate of, for example, $1 > p \geq \frac{1}{3}$ is used.

The apparatus of FIG. 17 includes a pixel data input unit 1, a two dimensional picture storage unit 2, a control unit 3, and a monochrome data logic calculation circuit 4. The pixel data input unit 1 includes eight shift registers 11 to 18. The shift registers 11 and 12 hold data of the original picture pixels on the first line, the shift registers 13 and 14, the second line, the shift registers 15 and 16, the third line, and the shift registers 17 and 18, the fourth line.

The control unit 3 includes a line disappearance susceptibility data generation portion 31 and a region discrimination portion 32.

The distribution of original picture pixels in relation with the detection of disappearable pixels is illustrated in FIG. 6. The division of area and the reference pixels in relation with the detection of disappearable pixels are illustrated in FIGS. 19 and 20.

A table of the conditions for detecting a disappearance of pixels to be converted as the basis of the operation of the apparatus of FIG. 17 is shown in FIGS. 12A to 12D. A table of logic calculations for the apparatus of FIG. 17 is shown in FIG. 22.

Figure 23:
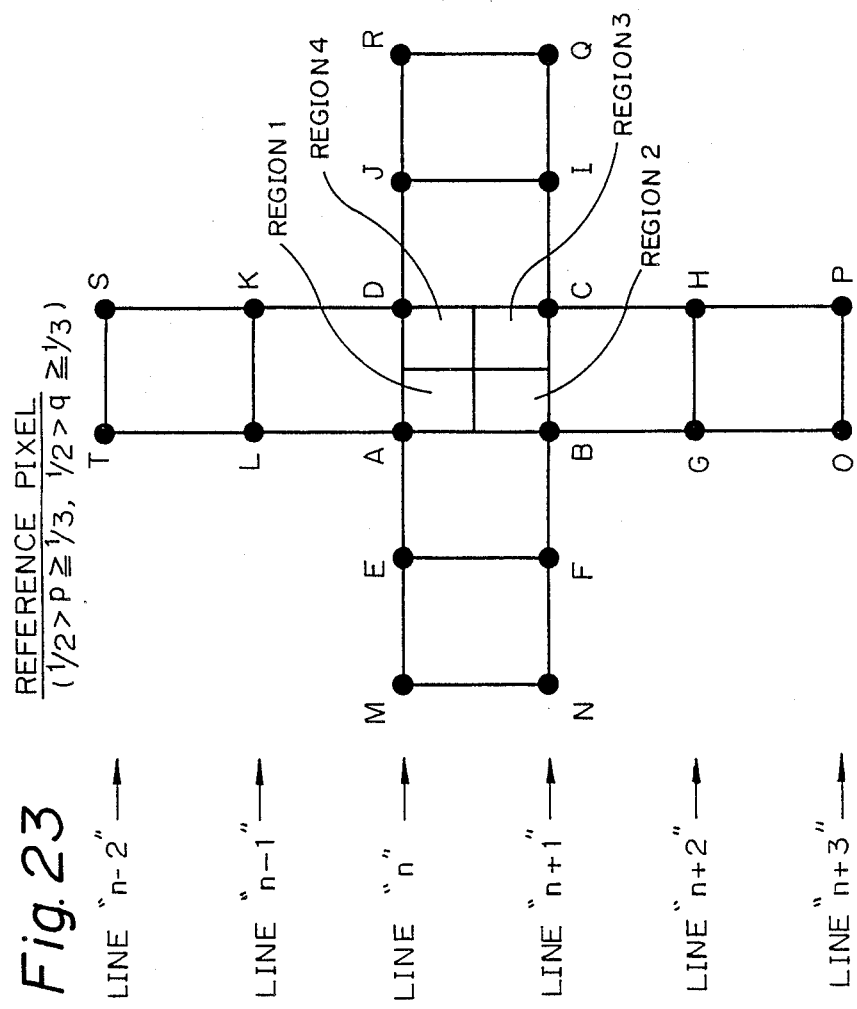
FIG. 23 illustrates an assumption of reference pixels used in the apparatus of FIG. 17.
Figure 24B:
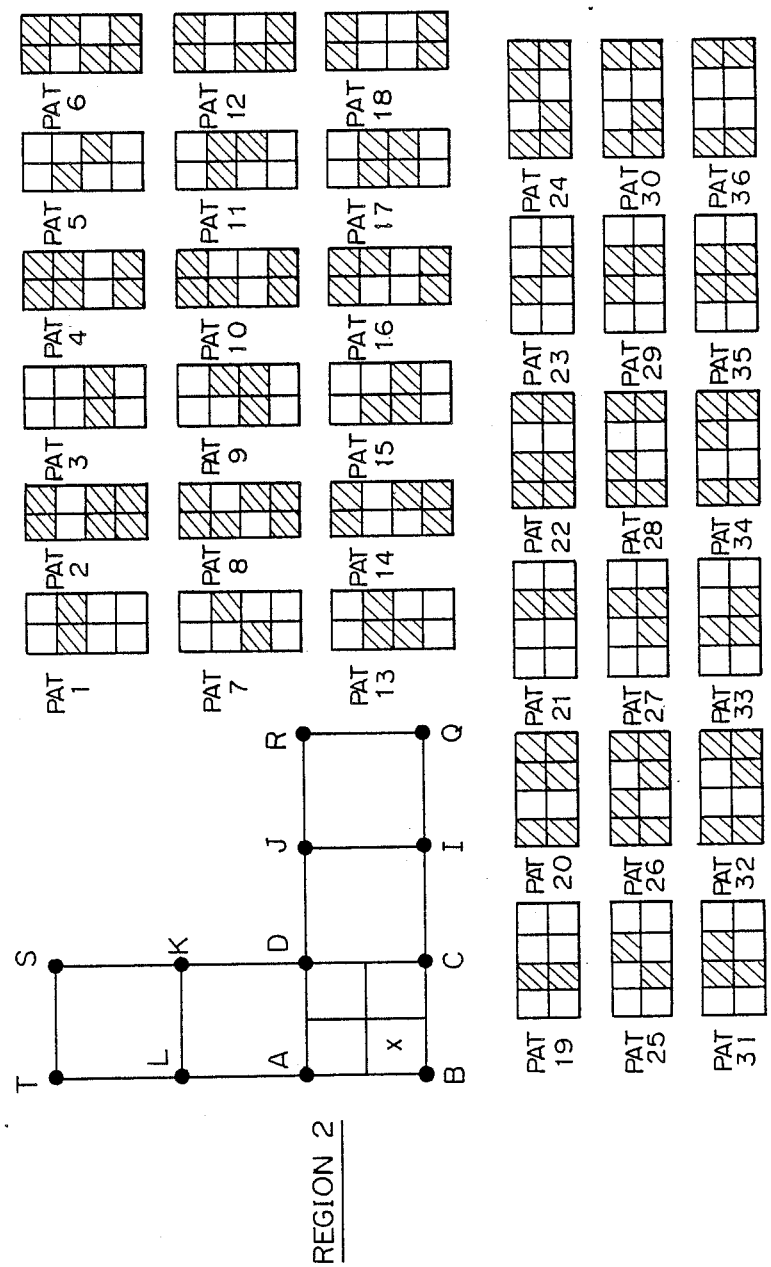
Figure 24C:
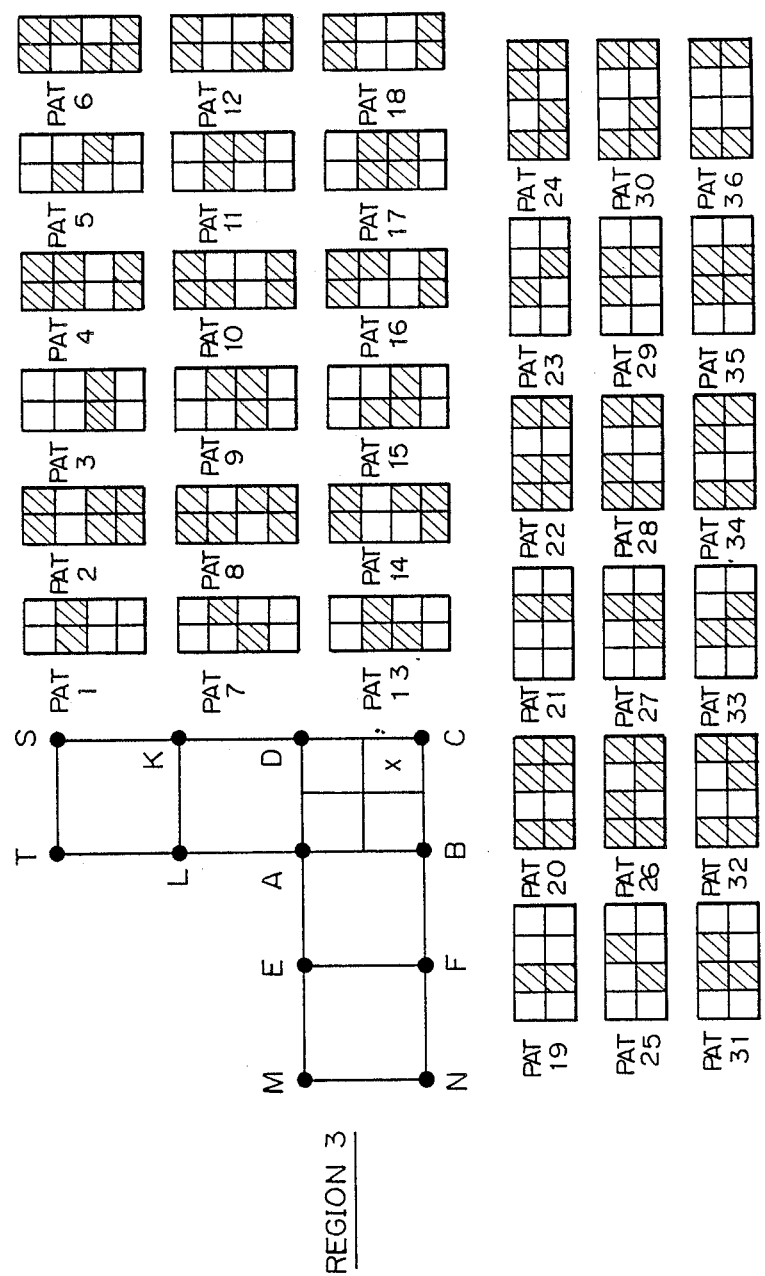
Figure 24D:
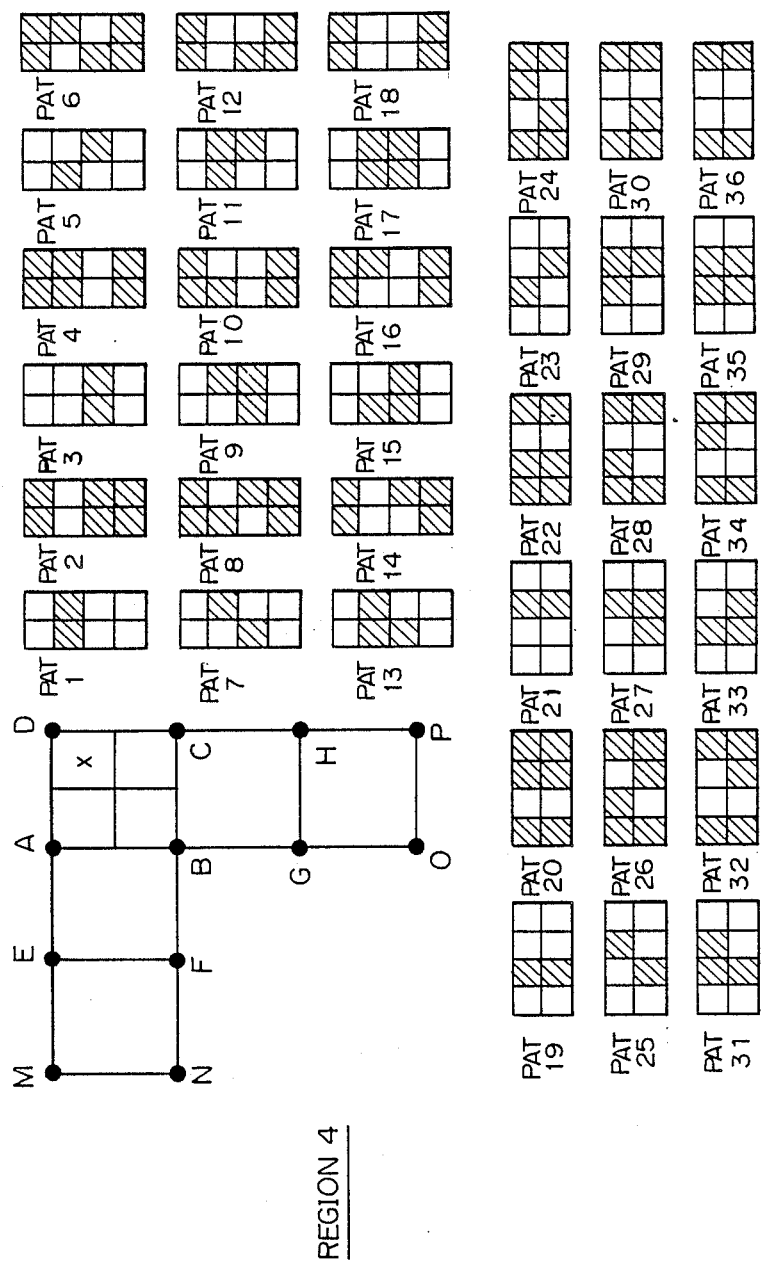

An assumption of reference pixels used in the apparatus of FIG. 17 is illustrated in FIG. 23. Basic patterns of fine line disappearance in relation with the apparatus of FIG. 17 are illustrated in FIGS. 24A to 24D. A table of the condition for detecting disappearance of pixels to be converted as the basis of the operation of the apparatus of FIG. 17 is shown in FIGS. 25A to 25D. A table of logic calculations used in the operation of the apparatus of FIG. 17 is shown in FIG. 26.

FIG. 27 Embodiment

Figure 27:
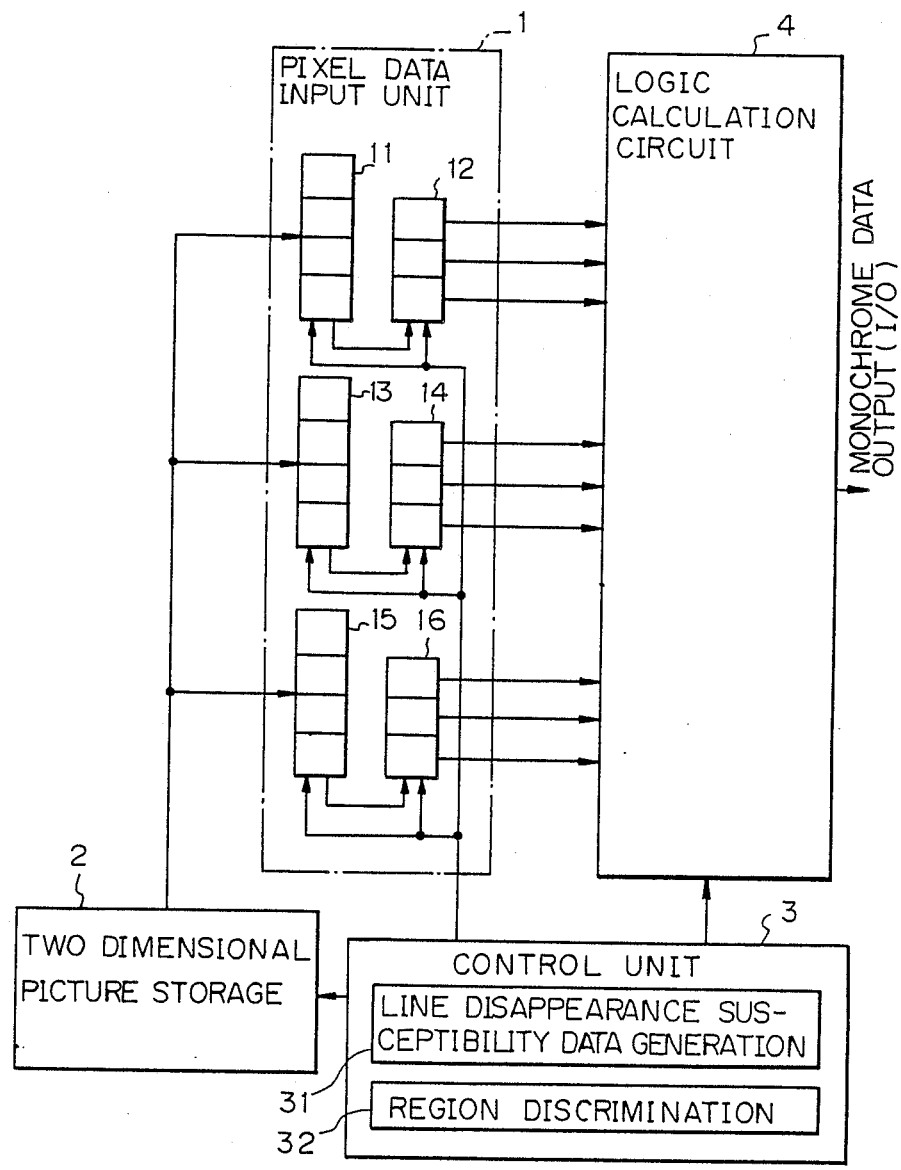
FIG. 27 is a schematic diagram of an apparatus for carrying out a process for reducing a picture according to another embodiment of the present invention.
Figure 28:
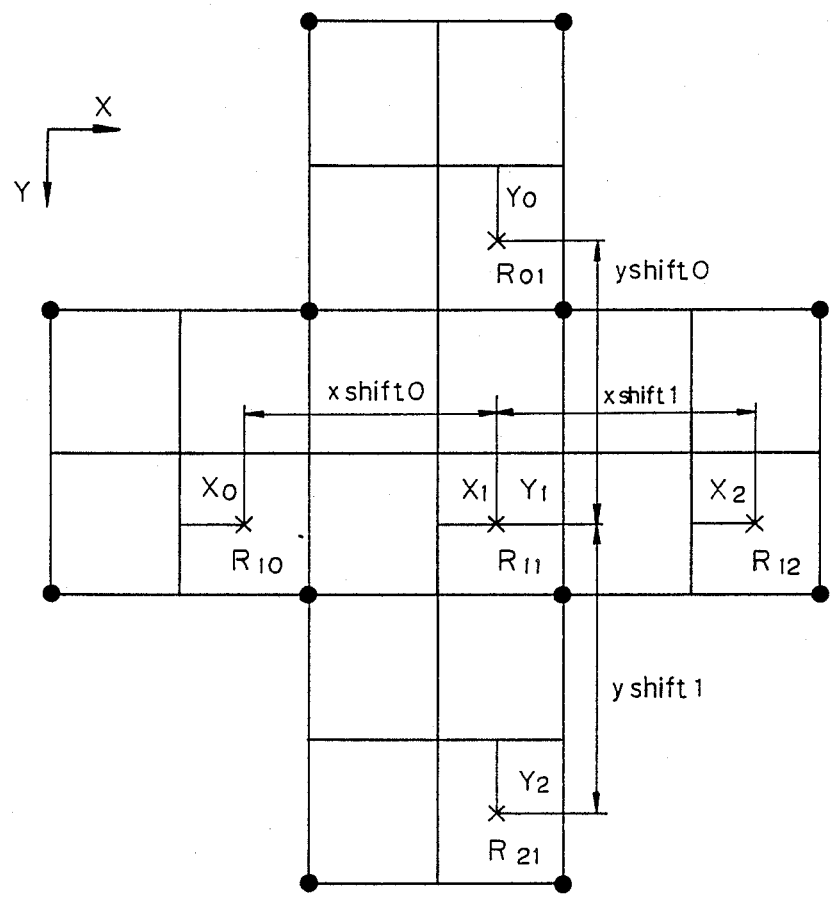
FIG. 28 illustrates the distribution of original picture pixels similar to FIG. 6.

An apparatus for carrying out a process for reducing a picture according to another embodiment of the present invention is shown in FIG. 27. The apparatus of FIG. 27 is of the selective processing conversion method type and uses the division of 4 sections. In the apparatus of FIG. 27, the reduction rate of, for example, $1 > p \geq \frac{1}{3}$ is used.

The apparatus of FIG. 27 includes a pixel data input unit 1, a two dimensional picture storage 2, a control unit 3, and a monochrome data logic calculation circuit 4. The pixel data input unit 1 includes shift registers 11 to 16, the shift registers 11 and 12 hold the data of the original picture pixels in the first line, the shift registers 13 and 14, the second line, and the shift registers 15 and 16, the third line. The control unit 3 includes a line disappearance susceptibility data generation portion 31 and a region discrimination portion 32.

In the operation of the apparatus of FIG. 27, the data produced regarding a line susceptible to disappearance further includes; affirmations, with regard to the Y-axis direction, of an inequality in that the preceding pixel position coordinate ($y_0$) of the converted picture is greater than a reference position coordinate (y ref), an inequality in that the present pixel position coordinate ($y_1$) is greater than a reference position coordinate (y ref), and an inequality in that the subsequent pixel position coordinate ($y_2$) is greater than a reference position coordinate (y ref); and the number of original picture pixels between the present pixel position coordinate ($y_1$) and the preceding pixel position coordinate ($y_0$) or the subsequent pixel position coordinate ($y_2$).

In the operation of the apparatus of FIG. 27, in the region discrimination step, an affirmation, with regard to the X-axis direction, of an inequality in that the present pixel position coordinate ($x_1$) of the converted picture is greater than a reference position coordinate (x ref), and an affirmation, with regard to the Y-axis direction, of an inequality in that the present pixel position coordinate ($y_1$) of the converted picture is greater than a reference position coordinate (y ref), are used.

In the operation of the apparatus of FIG. 27, in the monochrome data calculation step, a logic calculation to preserve a fine line based on data regarding a line susceptible to disappearance is added to a logic calculation step for combination with the most adjacent pixel of the original picture or the pixels close to the most adjacent pixel of original picture.

In the operation of the apparatus of FIG. 27, assuming that the reduction rate in the X-axis direction is p, the reduction rate in the Y-axis direction is q, the number n of lines is given as $n = 2^m$ ($m = 0, 1, 2, \ldots$), in the case where the desired reduction rates in the X-axis direction and the Y-axis direction are $1 > p \geq 1/n$ and $1 > q \geq 1/n$, "m−1" times reduction processes with a reduction rate of $\frac{1}{2}$ and one reduction process with reduction rates of $2^{m-1}*p$ and $2^{m-1}*q$, are carried out.

Figure 29:
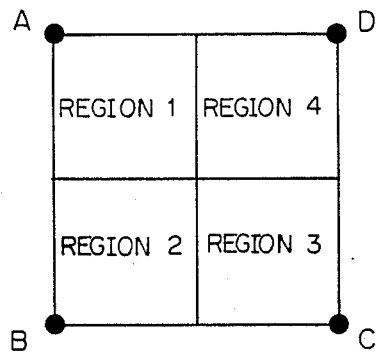
FIG. 29 illustrates a method of division into regions used in the apparatus of FIG. 27.
Figure 30:
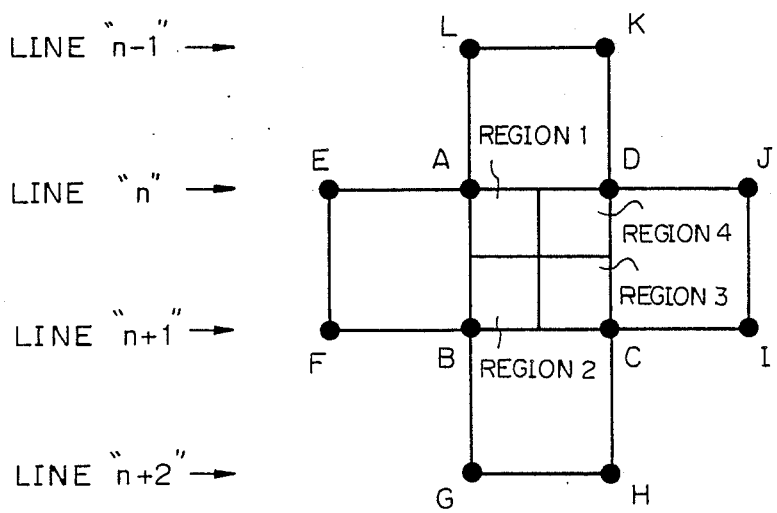
FIG. 30 illustrates an assumption of reference pixels in the apparatus of FIG. 27.

The distribution of original picture pixels with respect to reduced picture pixels used in the apparatus of FIG. 27 is illustrated in FIG. 6. A method of division into regions used in the apparatus of FIG. 27 is illustrated in FIG. 29. An assumption of reference pixels used in the apparatus of FIG. 27 is illustrated in FIG. 30. A table of the condition for detecting disappearance of pixels to be converted as the basis of the operation of the apparatus is shown in FIGS. 12A to 12D, and a table of the logic calculation used in the operation of the apparatus of FIG. 27 is shown in FIG. 32.

Examples of Apparatus Structure and Operation

Figures 33, 33A:
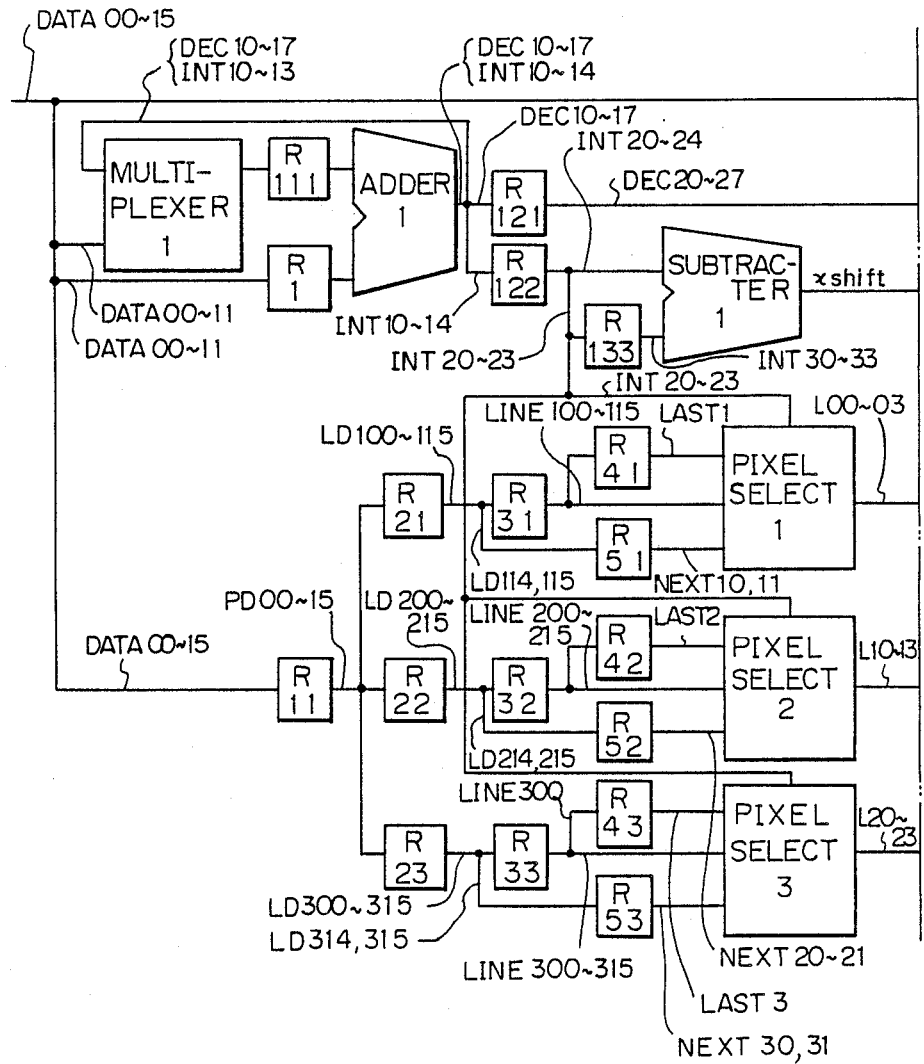
Figure 33C:
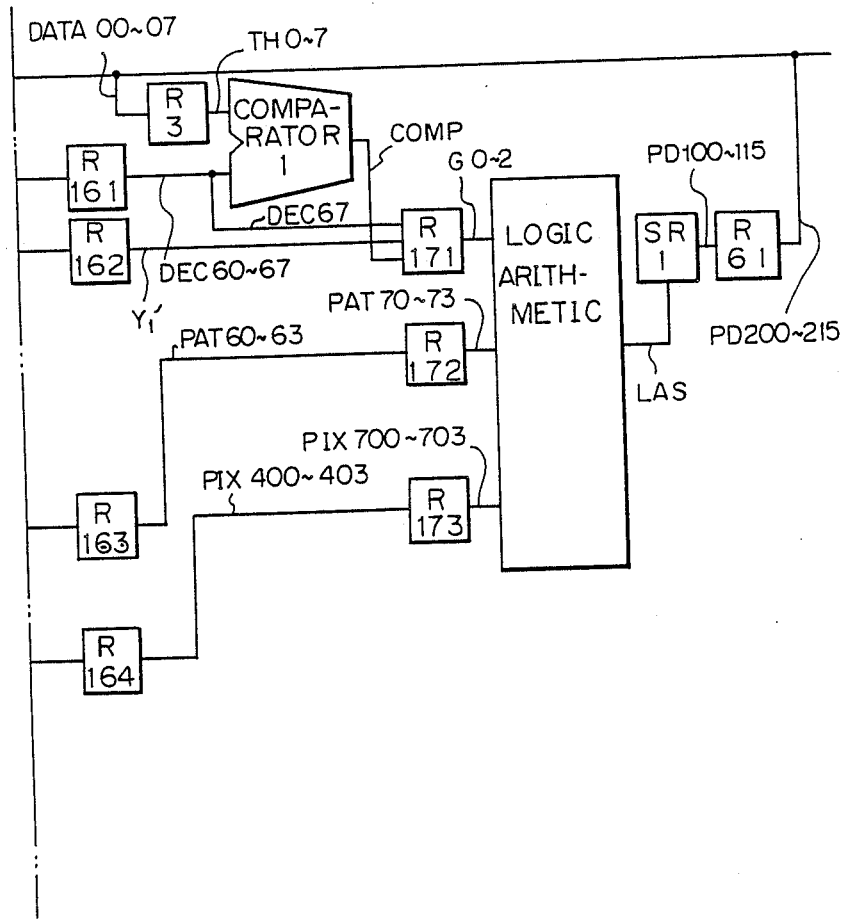

An example of the structures of an apparatus for carrying out a process for reducing a picture according to an embodiment of the present invention is shown in FIGS. 33A, 33B and 33C.

Figure 34A:
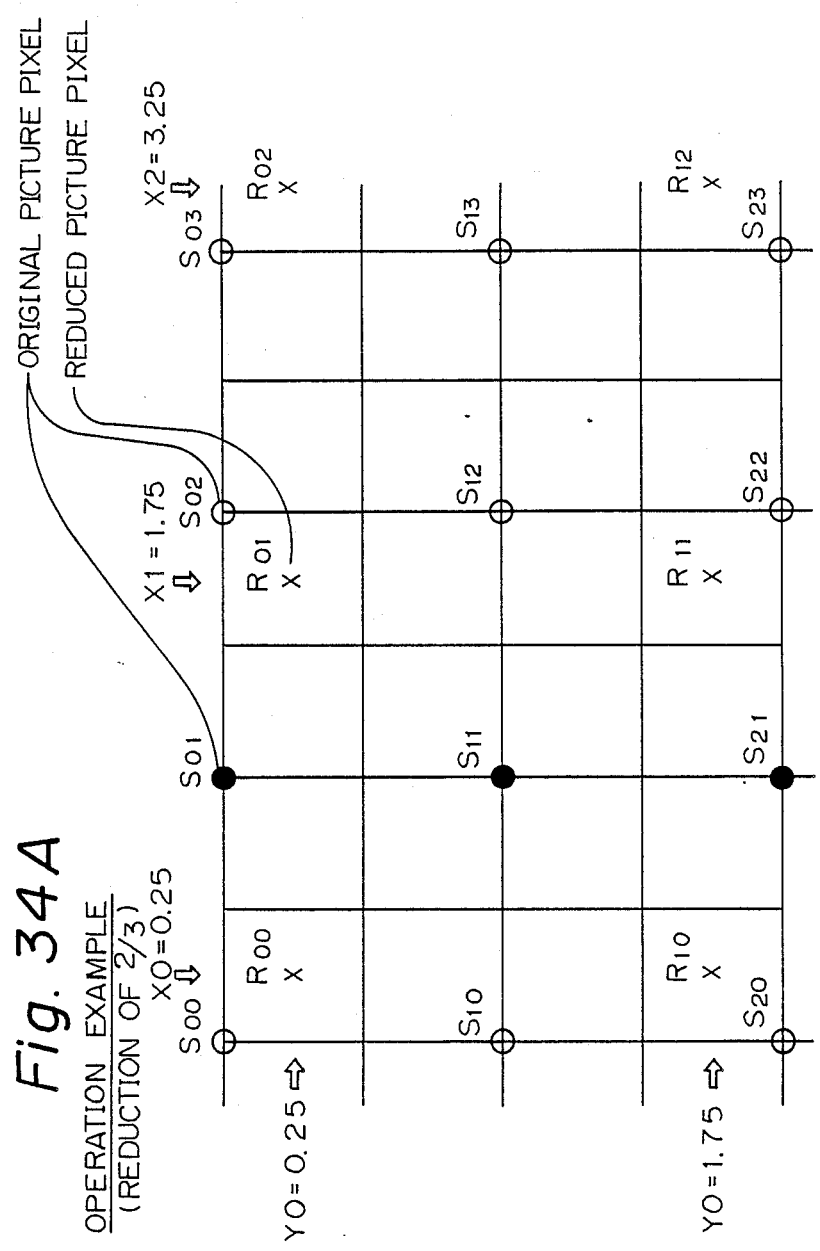
Figure 34C:
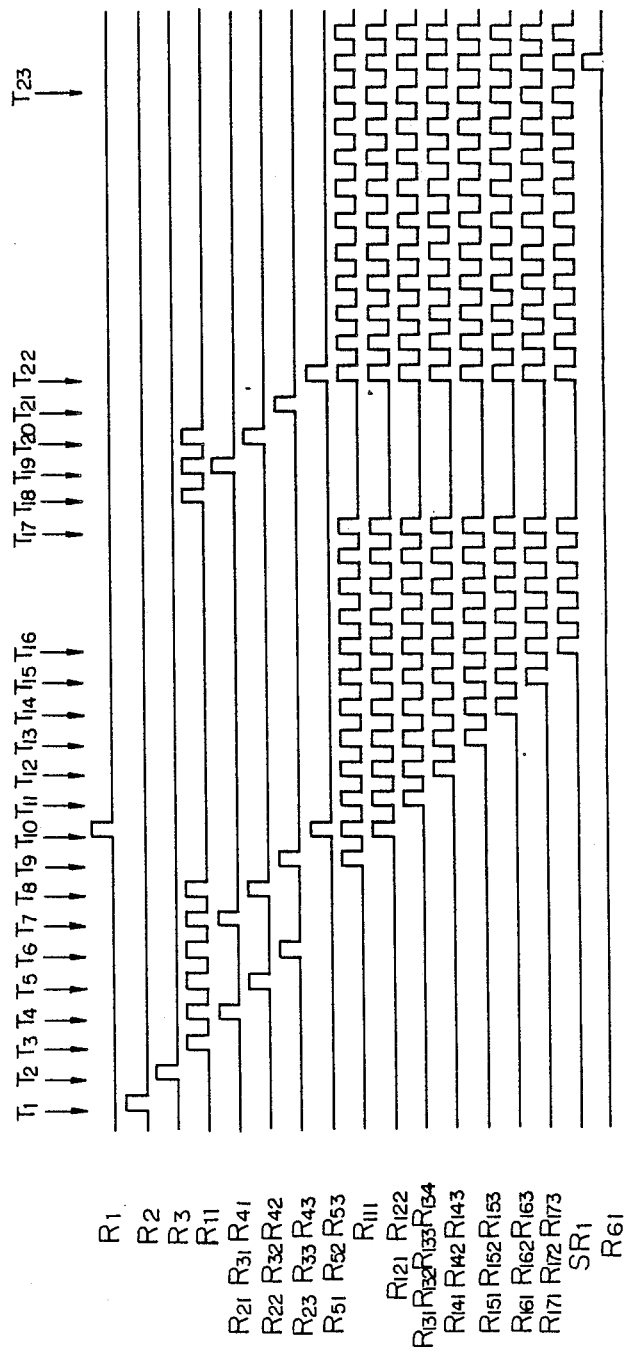

An example of the operation of an apparatus for carrying out a process for reducing a picture according to an embodiment of the present invention is shown in FIGS. 34A, 34B, and 34C.

In FIG. 33, the multiplexer-1, the adder-1, and the register R111 and R1 constitute an Xi coordinate calculation portion, the pixel selection circuits-1, -2, and -3, the registers R11, R21 to R23, R31 to R33, R41 to 43, R51 to 53, and R134 constitute an original picture pixel input portion, the subtracter-1, and the register R122, R132, R133, and R142 constitute a disappearance susceptibility data generation portion, the pattern group decision circuit, and the register R131, R132, R141, R142, and R151 constitute a pattern group decision portion, the pattern detection circuit and the registers R152 and R153 constitute a pattern detection portion, the comparator-1 and the registers R3, R161, and R171 constitute a region division decision portion, and the logic arithmetic circuit and the register R171, R172, and R61, and the shift register SR1 constitute a logic arithmetic portion.

In FIGS. 33A, B, and C, the registers R1 to R3 are applied to an operation in units of one line, the registers R11, R21 to R23, R31 to R33, R41 to R43, R51 to R53, and R61 are applied to an operation in units of one word, i.e., 16 pixels, and the registers R111, R121, R122, R131 to R134 R141 to R143, R151 to R153, R161 to R164, and R171 to R173 are applied to an operation in units of one pixel.

In FIGS. 33A, B, and C, in the pixel selection circuits-1, -2, and -3, a selection of 4 reference pixels is carried out for detecting a line susceptible to disappearance from among 19 pixels, i.e., 16 pixels plus 3 adjacent pixels per 3 lines in question. In the pattern group decision circuit, a decision concerning fine line pattern disappearance is carried out by using the table of conditions of detection of disappearance. In the pattern detection circuit, a decision of whether or not a fine line pattern susceptible to disappearance appears in the reference pixel group is made. In the logic arithmetic circuit, the monochrome data of the converted picture pixel is decided from the decision of a region, the detection of a fine line pattern, and the data of the reference pixel.

An example of operation of the apparatus according to an embodiment of the present invention will be described in the TABLE below with reference to FIG. 34A illustrating a $\frac{2}{3}$ reduction, FIG. 34B illustrating standard pixel for the reference pixel group in correspondence with the timings, and FIG. 34C illustrating the timings.

TABLE

| TIMING | OPERATIONS |
|---|---|
| | (PART 1) |
| $T_1$ | Store following data into R2: yshift0 = 1, yshift1 = 0, Y$_0$location = 1, Y$_1$location = 0, Y$_2$location = 1. |
| $T_2$ | Store following data in R3: coordinate of intersecting point between Y = Y$_1$ = 0.25 and division equation. |
| $T_3$ | Store following data into R11: 16 bit/word picture data including reference pixels $S_{00}, S_{01}, S_{02}, \ldots$ |
| $T_4$ | Store following data into R21: 16 bit/word picture data including reference pixels $S_{00}, S_{01}, S_{02}, \ldots$ of R11. Store following data into R11: 16 bit/word picture data including reference pixels $S_{10}, S_{11}, S_{12} \ldots$ |
| $T_5$ | Store following data into R22: 16 bit/word picture data including reference pixels $S_{10}, S_{11}, S_{12}, \ldots$ of R11. Store following data into R11: 16 bit/word picture data including reference pixels $S_{20}, S_{21}, S_{22} \ldots$ |
| | (PART 2) |
| $T_6$ | Store following data into R23: 16 bit/word picture data including reference pixels $S_{20}, S_{21}, S_{22}, \ldots$ of R11. Store following data into R11: picture data subsequent to 16 bit/word picture data including reference pixels $S_{00}, S_{01}, S_{02}$. |
| $T_7$ | Store following data into R31: 16 bit/word picture data including reference pixels $S_{00}, S_{01}, S_{02}, \ldots$ of R21. Store following data into R21: picture data subsequent to 16 bit/word picture data including reference pixels $S_{00}, S_{01}, S_{02}, \ldots$ of R11. Store following data into R11: picture data subsequent to 16 bit/word picture data including reference pixels $S_{10}, S_{11}, S_{12} \ldots$ |
| $T_8$ | Store following data into R32: 16 bit/word picture data including reference pixels $S_{10}, S_{11}, S_{12}, \ldots$ of R22. Store following data into R22: picture data subsequent to 16 bit/word picture data including reference pixels $S_{10}, S_{11}, S_{12}, \ldots$ of R11. Store following data into R11: picture data subsequent to 16 bit/word picture data including reference pixels $S_{20}, S_{21}, S_{22}, \ldots$ |
| | (PART 3) |
| $T_9$ | Store following data into R33: 16 bit/word picture data including reference pixels $S_{20}, S_{21}, S_{22}, \ldots$ of R23. Store following data into R23: 16 bit/word picture data including reference pixels $S_{20}, S_{21}, S_{22}, \ldots$ of R11. Store following data into R111: the initial X-coordinate $X_0 = 0.25$ Calculate the coordinate $X_0$ by the adder-1 during period from $T_9$ to $T_{10}$. |
| $T_{10}$ | Store distance 1/P between converted pixels into R1 where 1/P = 3/2. Store beginning 2 bits: LD114, 115 of 16 bit/word data processed subsequent to R21 into R51. Store beginning 2 bits: LD214, 215 of 16 bit/word data processed subsequent to R22 into R52. Store beginning 2 bits: LD314, 315 of 16 bit/word data processed subsequent to R23 into R53. Store initial X-coordinate: $X_0 = 0.25$ as output of adder-1 into R111. Calculate coordinate of $X_1$: $X_1 = 0.25 + 1.5 = 1.75$ by adder-1 during period from $T_{10}$ to $T_{11}$. Store integer portion INT10 to 14 of initial X-coordinate as output of adder-1 into R122, decimal portion DEC10 to 17 into R121. |
| | (PART 4) |
| $T_{10}$ | Calculate line disappearance data × shift by subtracter-1 during period from $T_{10}$ to $T_{11}$. Select 4 pixels from 19 bits consisting of 16 bit/word of each of R31, R41, and R51 and preceding 1 bit and subsequent 2 bits by pixel selection circuits—1, —2 and —3 according to output INT20 to 23 of R122 during period from $T_{10}$ to $T_{11}$. |
| $T_{11}$ | Store X-coordinate of $X_1$: $X_1 = 1.75$ as output of adder-1 into R111. Calculate X-coordinate of $X_2$: 2 = 1.75 + 1.5 = 3.25 by adder-1 during period from $T_{11}$ to $T_{12}$. (Hereinafter, coordinate calculations by adder-1 are abbreviated.) Store integer portion INT10 to 14 of X-coordinate of $X_1$ as output of adder-1 into R122, decimal portion DEC 10$^1$ to 17 into R121. (Explanations of similar storing operations at later timings are abbreviated.) Store x shift = 1 as output of subtracter-1 into R132. Store INT20 to 23 as output of R122, into R133. Calculate disappearance data x shift by subtracter-1 during period $T_{11}$ to $T_{12}$. (Hereinafter, such disappearance data calculations are abbreviated.) |

TABLE-continued

| TIMING | OPERATIONS |
|---|---|
| | Store data corresponding to 12 reference pixels selected by pixel selection circuits: Pixel Selection −1, −2, and −3 into R134. (Explanation of similar storing operations at later timings are abbreviated.) |
| | (PART 5) |
| $T_{12}$ | Store xshift0 = 1 as output of R132 into R142. Store xshift1 = 0 as output of subtracter-1 into R132. Produce signal TLP 40, 41 representing fine line pattern during period $T_{12}$ to $T_{13}$ from following 10 data: yshift0 = 1, yshift1 = 0, $Y_0$location = 1, $Y_1$location = 0, $Y_2$location = 1 as Y-axis line disappearance data from R2 xshift0 = 1 as output of R142, xshift1 = 0 as output of R132, location of $X_0$ = 0 from DEC57 of R151, location of $X_1$ = 0 from DEC47 of R141, location of $X_2$ = 1 from DEC37 of R131. (Explanation of similar operations at later timings are abbreviated.) |
| $T_{13}$ | Store output TLP40, 41 of pattern group decision circuit of R152. Store 12 reference pixel data as outputs PIX400 to 411 of R143 to R153. Detect existence of fine line operation in actual picture by pattern detection circuit during period T13 to T14 based on TLP50, 51 representing fine line pattern from R152 and PIX500 to 511 representing 12 reference pixel data from T153. (Explanations of similar operations at later timings are abbreviated.) |
| | (PART 6) |
| $T_{14}$ | Store output DEC 50 to 57 of R151 into R161. Store data of $Y_1$ location = 0 of R2 into R162. Compare output TH 0 to 7 of R3 and output DEC 60 to 67 of R161 by comparator-1 during period from T14 to T15 to determine left/right with respect to border of regions. (Explanations of similar operations at later timings are abbreviated.) |
| $T_{15}$ | Store output COMP of comparator-1, output DEC 67 of R161, and output $Y_1'$ of R162 into R171. Store output PAT 60 to 63 of R163 into R172. Store output PIX 600 to 603 for reference pixels A, B, C, D, of R164 into R173. Carry out calculation in arithmetic circuit during period from T15 to T16 based on output G0 to 2 of R171 as region signal, output PAT 70 to 73 of R172 as disappearance indication signal, and output PIX 701 to 703 of R173 as reference pixel indication signal for reference pixels A, B, C, D, according to logic calculation formula, and from result of this calculation deliver output for determining monochrome data of converted picture pixel. (Explanations of similar operations at later timings are abbreviated.) |
| $T_{16}$ | Store output LAS of logic arithmetic circuit into shift register SR1. |
| | (PART 7) |
| $T_{17}$ | Prepare for receiving next 16 bit/word picture data at later timing, because value of adder-1 becomes greater than 16. Operations of R111 and so on are stopped until receipt of data. |
| $T_{18}$ to $T_{21}$ | Store next 16 bit/word picture data into $R_{21}$, $R_{22}$, and $R_{23}$ through R11. |
| $T_{22}$ | Release stopping of operations of elements for restarting processes for pixel units, because next 16 bit/word picture data has been stored into R21, R22, and R23. |
| $T_{23}$ | Store output PD 00 to 15 of SR1 into R61 and transfer data through common bus, because 16 converted picture pixels have been stored into SR1. (After that, processes with unit of pixel, word, and line are carried out in similar manner.) |

I claim:

1. A process for reducing a picture by determining monochrome data of converted picture pixels based on monochrome data of original picture pixels, and for avoiding disappearance of fine lines from the converted picture, said process comprising the steps of:
(a) successively receiving monochrome data of original picture pixels in the vicinity of a converted picture pixel;
(b) generating data of a line susceptible to disappearance;
(c) discriminating a divisional region in which said converted picture pixel is located;
(d) calculating, according to logic calculations, monochrome data of said converted picture pixel based on said generated data, said discriminated divisional region, and said monochrome data of original picture pixels; and
(e) producing a signal indicating said monochrome data of said converted picture pixel according to said calculation.

2. A process according to claim 1, wherein step (b) includes the sub-steps of:
determining, with regard to an X-axis direction, if a preceding converted picture pixel position coordinate is greater than a reference position coordinate, if the pixel position coordinate of said converted picture pixel is greater than a reference position coordinate, and if a subsequent converted picture pixel position coordinate is greater than a reference position coordinate; and
determining the number of original picture pixels between said converted picture pixel position coordinate and said preceding converted picture pixel position coordinate or said subsequent converted picture pixel position coordinate.

3. A process according to claim 2, wherein step (b) includes the sub-steps of:
determining with regard to a Y-axis direction, if a preceding converted picture pixel position coordinate is greater than a reference position coordinate, if the pixel position coordinate of said converted picture pixel is greater than a reference position coordinate, and a subsequent converted picture pixel position coordinate is greater than a reference position coordinate; and
determining the number of original picture pixels between said converted picture pixel position coordinate and said preceding converted picture pixel position coordinate or said subsequent converted picture pixel position coordinate.

4. A process according to claim 1, wherein includes the sub-steps of:
   determining, with regard to an X-axis direction, if the present pixel position coordinate of said converted picture pixel is greater than a reference position coordinate; and
   determining, with regard to a Y-axis direction, if the pixel position coordinate of said converted picture pixel is greater than a reference position coordinate.

5. A process according to claim 1, wherein step (d) includes the sub-step of:
   performing a logic calculation to preserve a fine line based on said generated data and the most adjacent pixel of the original picture or the pixels close to the most adjacent pixel of an original picture.

6. A process according to claim 1, wherein a reduction rate in an X-axis direction is p, a reduction rate in a Y-axis direction is q, the number n of lines of said monochrome data of original picture pixels is given as $n=2^2$ ($m=0, 1, 2 \ldots$), the desired reduction rates in the X-axis direction and the Y-axis direction are $1>p\geq 1/n$ and $1>q\geq 1/n$, steps (a)–(e) are carried out "$m-1$" times with a reduction rate of $\frac{1}{2}$, and steps (a)–(e) are carried out once with reduction of $2^{m-1}*p$ and $2^{m-1}*q$.

7. A process according to claim 1, wherein step (b) includes the sub-step of:
   generating said line data based on a picture reduction rate; and step (d) includes the sub-step of:
   calculating said monochrome data of said converted picture pixel further based on said reduction rate.

8. An apparatus for reducing a picture by determining monochrome data of converted picture pixels based on monochrome data of original picture pixels, and for avoiding disappearance of fine lines in the converted picture,
   said apparatus comprising:
   monochrome data receiving means for receiving a sequence of monochrome data of original picture pixels in the vicinity of a converted picture pixel;
   control means including a disappearance susceptibility line data generation means for generating data of a line susceptible to disappearance, and a region discrimination means for discriminating a divisional region in which said converted picture pixel is located; and
   monochrome data calculation means, operatively connected to said monochrome data receiving means and said control means, for calculating monochrome data of said converted picture pixel based on said generated data, said discriminated divisional region, and said monochrome data of original picture pixels.

9. A process for providing a reduced picture of converted picture pixels by reducing the number of original picture pixels in an x-axis direction by a first reduction rate and reducing the number of original picture pixels in a y-axis direction by a second reduction rate, and for preventing fine line disappearance, comprising the steps of:
   (a) receiving monochrome data of original picture pixels in the vicinity of a converted picture pixel;
   (b) generating condition data based on the first and second reduction rates and spatial relationships between converted picture pixels and original picture pixels in the vicinity of said converted picture pixel;
   (c) detecting a fine line susceptible to disappearance based upon said condition data;
   (d) discriminating a divisional region in which said converted picture pixel is located;
   (e) calculating, according to logic calculations, monochrome data of said converted picture pixel based on the first and second reduction rates, said detected fine line, said divisional region, and said received monochrome data.

10. A process as recited in claim 9, wherein step (b) includes the sub-step of:
    generating spatial relationship data based on at least one of the following spatial relationships:
    (1) the number of lines in the x-axis direction of original picture pixels between said converted picture pixel and a first preceding converted picture pixel;
    (2) the number of lines in the y-axis direction of original picture pixels between said converted picture pixel and a second preceding converted picture pixel;
    (3) the number of lines in the x-axis direction of original picture pixels between said converted picture pixel and a first subsequent converted picture pixel;
    (4) the number of lines in the y-axis direction of original picture pixels between said converted picture pixel and a second subsequent converted picture pixel;
    (5) if the x-axis coordinate of said first preceding converted picture pixel is greater than a first reference x-axis coordinate;
    (6) if the y-axis coordinate of said second preceding converted picture pixel is greater than a first reference y-axis coordinate;
    (7) if the x-axis coordinate of said converted picture pixel is greater than a second reference x-axis coordinate;
    (8) if the y-axis coordinate of said converted picture pixel is greater than a second reference y-axis coordinate;
    (9) if the x-axis coordinate of said first subsequent converted picture pixel is greater than a third reference x-axis coordinate; and
    (10) if the y-axis coordinate of said second subsequent converted picture pixel is greater than a third reference y-axis coordinate.

11. A process as recited in claim 9, wherein step (c) includes the sub-step of:
    detecting a pattern of said fine line.

12. A process as recited in claim 9, wherein step (e) includes the sub-step of:
    producing a signal indicating monochrome data of said converted picture pixel based on said calculation.

13. A process as recited in claim 12, wherein steps (a)–(e) are repeated for subsequent converted picture pixels.

* * * * *

UNITED STATES PATENT AND TRADEMARK OFFICE
CERTIFICATE OF CORRECTION

PATENT NO. : 4,930,021
DATED : May 29, 1990
INVENTOR(S) : Yoshiyuki Okada

It is certified that error appears in the above-identified patent and that said Letters Patent is hereby corrected as shown below:

- Col. 13, line 1, after "wherein" insert --step c--; and

Col. 13, line 20, change "$n=2^2$" to --$n=2^m$--.

Signed and Sealed this

Eighteenth Day of June, 1991

Attest:

HARRY F. MANBECK, JR.

*Attesting Officer*  *Commissioner of Patents and Trademarks*